United States Patent [19]
Shimizu

[11] Patent Number: 5,508,333
[45] Date of Patent: Apr. 16, 1996

[54] DIENE POLYMERS AND COPOLYMERS HAVING AN ALKOXYSILANE GROUP

[75] Inventor: Takashi Shimizu, Hachioji, Japan

[73] Assignee: Bridgestone Corporation, Tokyo, Japan

[21] Appl. No.: 365,936

[22] Filed: Dec. 29, 1994

[30] Foreign Application Priority Data

| Dec. 29, 1993 | [JP] | Japan | 5-352389 |
| Dec. 29, 1993 | [JP] | Japan | 5-352390 |
| Jul. 8, 1994 | [JP] | Japan | 6-157540 |
| Dec. 7, 1994 | [JP] | Japan | 6-303852 |

[51] Int. Cl.$^6$ .................................................. C08J 3/20
[52] U.S. Cl. ...................... 524/424; 525/105; 524/430; 524/423; 524/431; 524/448; 524/449; 524/445; 524/500; 524/451; 524/425
[58] Field of Search .............................. 525/105; 524/500, 524/445, 451, 425, 424, 430, 448, 423, 449, 431

[56] References Cited

U.S. PATENT DOCUMENTS

| 3,764,592 | 10/1973 | Antonen et al. | 525/288 |
| 5,369,175 | 11/1994 | Hoximeier et al. | 525/105 |

FOREIGN PATENT DOCUMENTS

| 0002864 | 7/1979 | European Pat. Off. |
| 0299074 | 1/1989 | European Pat. Off. |
| 0316255 | 5/1989 | European Pat. Off. |
| 525071 | 2/1977 | Japan . |
| 56-104906 | 8/1981 | Japan . |
| 62-50346 | 3/1987 | Japan . |
| 62-227908 | 10/1987 | Japan . |
| 122940 | 1/1989 | Japan . |

OTHER PUBLICATIONS

Angood, A. C., et al, "Anionic Polymerization Initiated by Diethylamide in Organic Solvents." *Journal of Polymer Science*, Polymer Chemistry Ed., vol. 11, pp. 2777–2791 (1973).

*Primary Examiner*—Melvyn I. Marquis
*Attorney, Agent, or Firm*—Sughrue, Mion, Zinn, Macpeak & Seas

[57] ABSTRACT

A functionalized polymer includes a diene-type polymer having an alkoxysilane, aryloxysilane or aralkyloxysilane group, wherein the functionalized polymer has a molecular structure represented by at least one of the following formula(1), formula(2), and formula(3):

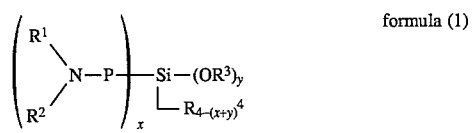

formula (1)

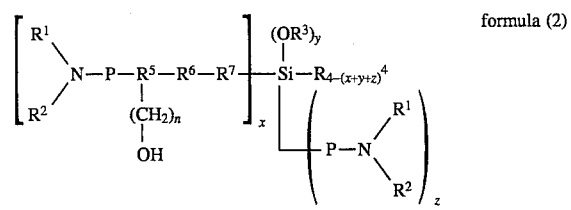

formula (2)

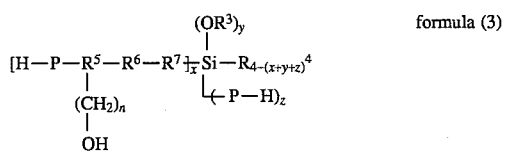

formula (3)

Further, an elastomeric composition is provided which includes a rubber material containing the functionalized polymer, and a filler such as white carbon. The functional polymer and the elastomeric composition exhibit excellent fracture properties, abrasion resistance, and low hysteresis (low rolling resistance and low fuel consumption).

33 Claims, 3 Drawing Sheets

DIENE POLYMERS AND COPOLYMERS HAVING AN ALKOXYSILANE GROUP

FIELD OF THE INVENTION

The present invention relates to a polymer and a composition using said polymer. More particularly, the present invention relates to a novel functionalized polymer having excellent fracture properties, good abrasion resistance and low hysteresis loss (low rolling resistance and low fuel consumption) and a novel elastomeric composition for a tire tread using the functionalized polymer.

PRIOR ART OF THE INVENTION

As tires for higher performance are being developed, a rubber having superior fracture properties, good abrasion resistance and low hysteresis loss (low rolling resistance) is desired as the rubber for the tire tread for such tires.

For decreasing the hysteresis loss, cis-1,4-polybutadiene rubber and the like are used. However, the polybutadiene rubber and the like do not have good fracture properties even though they have good abrasion resistance. As a rubber having a remarkably lower hysteresis loss, a solution polymerized butadiene-styrene rubber having the tin-carbon bond in the molecular chain has been developed. However, this rubber does not always have a good balance between wet grip and low rolling resistance.

An elastomeric composition for a tread in which carbon black alone is used as the filler for the rubber described above can realize the desired balance between various properties and performances to some degree. However, simultaneous improvement of wet grip and low rolling resistance to a higher degree has come to be required more urgently in recent years and it is difficult for the rubber described above to satisfy this requirement. In order to solve this problem, there have been disclosed elastomeric compositions in which white carbon such as silica is used alone or in combination with carbon black as the filler.

An example of such elastomeric composition is an elastomeric composition containing a polymer modified with a silane compound at the end and silica (for example, Japanese Patent Publication Showa 52(1977)-5071, Japanese Patent Application Laid-Open Nos. Showa 56(1981)-104906, Showa 62(1987)-50346 and Showa 62(1987)-227908). However, satisfactory improvements in the reinforcing property and the dispersion of fillers such as silica, and consequent improvements in the mechanical properties, are not exhibited by this polymer because this polymer does not have a sufficient number of alkoxy groups remaining in the polymer and also because the modification is made only at one of the molecular ends. Even when, for example, a dilithium compound is used as the initiator for the preparation of the polymer to modify both molecular ends (Japanese Patent Application Laid-Open No. Showa 62(1987)-227908), the ends formed are modified with alkoxysilane groups. Because the alkoxysilane group has the property that a coupling reaction takes place between the groups, the molecular weight of the polymer is practically uncontrollable, and the viscosity of the polymer cement during and after the modification reaction is increased, which causes problems with respect to stability in steam stripping as well as with respect to the stability of the prepared polymer over time.

Elastomeric composition comprising a polymer modified with a nitrogen compound at the end and silica are also known (for example, Japanese Patent Application Laid-Open No. Showa 64(1989)-22940). A diene-type polymer obtained by the alkyllithium-initiated polymerization is modified mainly at the terminated end part by copolymerization of a monomer containing nitrogen or by end modification using an aminobenzophenone compound or the like, and is used in these elastomeric compositions. Similarly to the polymer described above, only one end is modified with the compound containing nitrogen in this polymer, and the reinforcement with silica and the like is insufficient.

An elastomeric composition (a pneumatic tire) comprising a solution polymerized butadiene-styrene rubber having a specific molecular structure and silica has also been proposed (for example, Japanese Patent Application Laid-Open No. Heisei 3(1991)-239737). Reinforcement with silica is improved in this elastomeric composition to some degree but is still insufficient.

Furthermore, diene polymers are mainly used in the polymers described above. It has been known that diene polymers have low affinity with white carbon such as silica and it is difficult to obtain a homogeneously dispersed rubber composition by milling. To improve this drawback, a large amount of an expensive silane coupling agent is mixed together in many cases. Because the silane coupling agent is easily hydrolyzed in air, sufficient care must be taken in the handling thereof, and it is difficult to obtain a rubber composition with good reproducibility.

Therefore, the elastomeric composition described above do not have sufficient affinity or dispersing property with silica, and it is difficult for the elastomeric compositions to exhibit sufficient reinforcement with silica, to exhibit sufficient fracture properties, and to achieve a high level of balance between various properties such as abrasion resistance, wet grip, low rolling resistance, and the like.

Thus, the current situation in the field is that a polymer composition which satisfies various required properties with a good balance and which is advantageous for practical use has not yet been obtained.

SUMMARY OF THE INVENTION

Accordingly, an object of the present invention is to provide a novel functionalized polymer having excellent fracture properties and low hysteresis loss (low rolling resistance and low fuel consumption) and a novel elastomeric composition using the functionalized polymer.

To this end, the functionalized polymer of the present invention comprises a diene-type polymer having an alkoxysilane group, an aryloxysilane group, or an aralkyloxysilane group, wherein the functionalized polymer has a molecular structure represented by at least one of the following formula(1), formula(2), and formula (3):

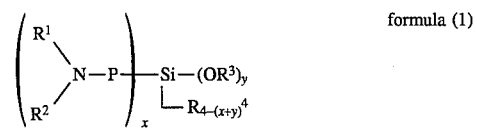

formula (1)

-continued

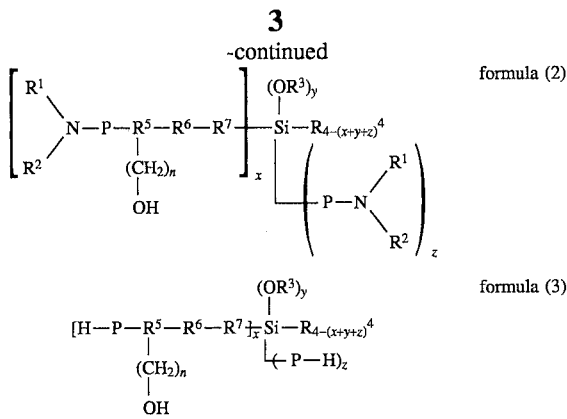

wherein P represents a diene-type polymer; $R^1$, $R^2$, $R^3$ and $R^4$ are each selected from the group consisting of an aliphatic hydrocarbon group, an alicyclic hydrocarbon group and an aromatic hydrocarbon group, each having 20 or less carbon atoms; $R^1$, $R^2$, $R^3$ and $R^4$ may be the same or different; $OR^3$ may be the same or different when a plurality of $OR^3$ are contained; $R^1$ and $R^2$ may be bonded to each other to form a cyclic structure containing the nitrogen atom bonded therebetween, or to form a heterocyclic structure containing another heteroatom (an oxygen atom or a nitrogen atom) in addition to the nitrogen atom bonded therebetween; $R^5$ is selected from the group consisting of an aliphatic hydrocarbon group and an alicyclic hydrocarbon group, each having 20 or less carbon atoms; $R^6$ is selected from the group consisting of an oxygen atom, methylene group, and methylene group having substituents; $R^7$ represents an aliphatic hydrocarbon group having 1 to 20 carbon atoms; x represents an integer of 1 to 3; y represents an integer of 1 to 3; z represents an integer of 0 to 2; x+y and x+y+z each represent an integer of 2 to 4; and n represents 0 or 1.

The elastomeric composition of the present invention comprises a rubber material containing a functionalized polymer in an amount of 10 or more parts by weight in 100 parts by weight of the rubber material, and a filler of 10 to 100 parts by weight based on 100 parts by weight of the rubber material, wherein the filler contains a white carbon, and the functionalized polymer comprises a diene-type polymer having an alkoxysilane group, an arloxysilane group, or an aralkyloxysilane group, and has a molecular structure represented by at least one of formula(1), formula(2), and formula(3) described above.

DETAILED DESCRIPTION OF THE INVENTION

Figure 1A:
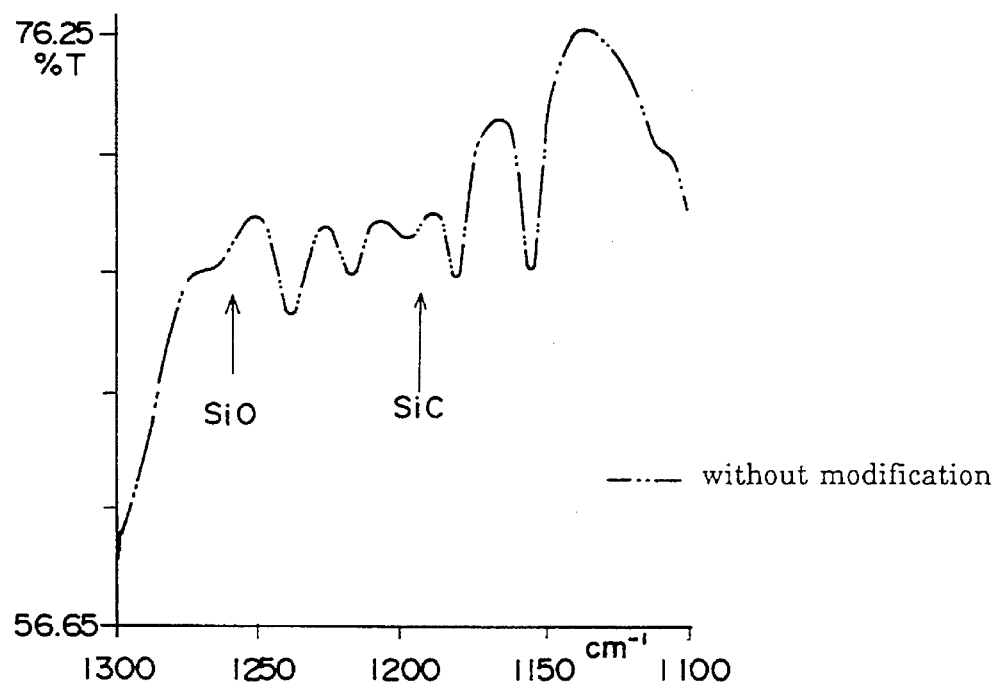
FIGS. 1A and 1B illustrate infrared spectra which show the presence of the Si—O bond and the Si—C bond in the polymer of the present invention.

The functionalized polymer represented by formula (1) described above has a molecular structure in which a functional group containing nitrogen is bonded to the end part of a conjugated diene polymer or a conjugated diene/vinyl aromatic hydrocarbon copolymer, and a silicon atom having at least one alkoxy group, aryloxy group or aralkyloxy group is bonded to another part of the polymer or the copolymer.

The functionalized polymer represented by formula (2) described above has a molecular structure in which a functional group containing nitrogen is bonded to the end part of a conjugated diene polymer or a conjugated diene/vinyl aromatic hydrocarbon copolymer, a functional group having a hydroxyl group is bonded to another part of the polymer or the copolymer, and a silicon atom having at least one alkoxy group, aryloxy group or aralkyloxy group is bonded to the functional group having the hydroxyl group.

The functionalized polymer represented by formula (3) described above has a molecular structure in which a hydrogen atom is bonded to the end part of a conjugated diene polymer or a conjugated diene/vinyl aromatic hydrocarbon copolymer, a functional group having a hydroxyl group is bonded to another part of the polymer or the copolymer, and a silicon atom having at least one alkoxy group, aryloxy group or aralkyloxy group is bonded to the functional group having the hydroxyl group.

It can be considered that the effect of the present invention arises due to the characteristic molecular structure of the functionalized polymer, which is related to at least one of the following three factors. The first factor is the reactivity of the alkoxy, aryloxy and/or aralkyloxy functional group in the molecular structure of the functionalized polymer with the surface of silica used as the filler. The second factor is the large affinity of the hydroxyl group in the molecular structure of the functionalized polymer which is located close to the alkoxy group, aryloxy group, and/or aralkyloxy group, with silanol group at the surface of silica. The third factor is the presence of the secondary amino functional group or the imino functional group in the molecular structure of the functionalized polymer.

P in formula (1), formula (2), and formula (3), which represent the functionalized polymer of the present invention, represents a diene-type polymer which is selected from a conjugated diene polymer or a conjugated diene/vinyl aromatic hydrocarbon copolymer. The conjugated diene polymer is a polymer composed of a conjugated diene unit obtained by polymerization of a conjugated diene monomer. The conjugated diene monomer is a conjugated diene hydrocarbon having 4 to 12 carbon atoms, preferably 4 to 8 carbon atoms, in one molecule. Examples of the conjugated diene monomer include 1,3-butadiene, isoprene, 2,3-dimethyl-1, 3-butadiene, 1,3-pentadiene, octadiene, and the like. The conjugated diene monomer may be used singly or as a mixture of two or more types. Among these monomers, 1,3-butadiene is particularly preferable.

The conjugated diene/vinyl aromatic hydrocarbon copolymer is a copolymer composed of a conjugated diene unit and a vinyl aromatic hydrocarbon unit which are obtained from a conjugated monomer and a vinyl aromatic hydrocarbon monomer, respectively, by copolymerization. Examples of the vinyl aromatic hydrocarbon monomer include styrene, α-methylstyrene, p-methylstyrene, o-methylstyrene, p-butylstyrene, vinylnaphthalene, and the like. Among these vinyl aromatic hydrocarbon monomers, styrene is particularly preferable.

As the conjugated diene polymer, polybutadiene having excellent abrasion resistance is preferable. As the conjugated diene/vinyl aromatic hydrocarbon copolymer, butadiene/styrene copolymers having excellent abrasion resistance and aging resistance are preferable. The microstructure of the butadiene part (cis-1,4, trans-1,4, and vinyl) in the diene-type polymer, such as polybutadiene and butadiene/styrene copolymer, is not particularly limited, but can be in a range generally obtained by using an organolithium initiator. Composition of the conjugated diene/vinyl aromatic hydrocarbon copolymer, such as butadiene/styrene copolymer, is not particularly limited, but the ratio by weight of the conjugate diene unit to the vinyl aromatic hydrocarbon unit is generally 30/70 to 95/5. The distribution of the units in the copolymer may be a random distribution, a block distribution, or an intermediate distribution of these distributions. A random distribution and an intermediate distribution are generally preferable.

In the functionalized polymer of the present invention, a functional group containing a nitrogen atom is bonded to the end part of the diene-type polymer in the functionalized polymer represented by formula (1) or formula (2), and a hydrogen atom is bonded to the end part of the diene-type polymer in the functionalized polymer represented by formula (3).

The functional group containing a nitrogen atom is represented by $R^1R^2N—$. $R^1$ and $R^2$ are selected from an aliphatic hydrocarbon, an alicyclic hydrocarbon, and an aromatic hydrocarbon, each having 20 or less, preferably 13 or less, carbon atoms. Therefore, this functional group is a residue group derived from a secondary amine compound. $R^1$ and $R^2$ may also be bonded to each other to form a cyclic structure containing the nitrogen atom bonded therebetween, or to form a heterocyclic structure containing another heteroatom (an oxygen atom or a nitrogen atom) in addition to the nitrogen atom bonded therebetween. This means that $R^1$, $R^2$ and the nitrogen atom may form a residue group derived from an imine compound. It is preferred that $R^1$ and $R^2$ are bonded to each other and form a group selected from the residue groups derived from saturated or unsaturated cyclic hydrocarbon compounds which contain a nitrogen atom and have 2 to 20, preferably 2 to 13, carbon atoms. These residue groups are, in other words, residue groups derived from imine compounds.

Among these functional groups containing a nitrogen atom, residue groups derived from imine compounds are preferable.

Examples of the secondary amine compound include dimethylamine, diethylamine, dipropylamine, di-n-butylamine, diisobutylamine, dipentylamine, dihexylamine, diheptylamine, dioctylamine, diallylamine, dicyclohexylamine, butylisopropylamine, dibenzylamine, methylbenzylamine, methylhexylamine, ethylhexylamine, and the like. Among these amines, amines having $R^1$ and $R^2$ each selected from aliphatic hydrocarbon groups having 1 to 10 carbon atoms, are preferable.

Examples of the imine compound include aziridine, azetidine, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine, dodecamethyleneimine, coniine, morpholine, N-methylpiperazine, N-ethylpiperazine, N-methylimidazolidine, N-ethylimidazolidine, oxazine, pyrroline, pyrrol, azepine, and the like. Among these imines, imine compounds having 4 to 12 carbon atoms are preferable.

$R^3$ and $R^4$ in formula (1), formula (2), and formula (3) each represent a group selected from an aliphatic hydrocarbon group, an alicyclic hydrocarbon group, or an aromatic hydrocarbon group, each having 20 or less, preferably 10 or less, carbon atoms. Examples of the aliphatic hydrocarbon group include methyl group, ethyl group, propyl group, butyl group, pentyl group, hexyl group, octyl group, and the like. Examples of the alicyclic hydrocarbon group include cyclopentyl group, cyclohexyl group, cycloheptyl group, and the like. Examples of the aromatic hydrocarbon group include phenyl group, naphthyl group, biphenyl group, anthryl group, phenanthryl group, and the like. $R^3$ is preferably an aliphatic hydrocarbon group or an aromatic hydrocarbon group, each having 10 or less carbon atoms. $R^3$ and $R^4$ are each most preferably methyl group, ethyl group, propyl group, or phenyl group. $R^4$ is not present in the functionalized polymer when the number of $OR^3$ bonded to silicon and the number of the diene-type polymer have some specified values [i.e., when x+y=4 in formula (1), and when x+y+z= 4 in formula (2) and formula (3)].

$R^5$ in formula (2) and formula (3) represents a group selected from an aliphatic hydrocarbon group and an alicyclic hydrocarbon group, each having 20 or less, preferably 6 or less, carbon atoms. Examples of the aliphatic hydrocarbon group include methyl group, ethyl group, propyl group, butyl group, pentyl group, hexyl group, octyl group, and the like. Methyl group, ethyl group, propyl group, and the like, are preferable among these groups. Examples of the alicyclic hydrocarbon group include cyclopentyl group, cyclohexyl group, cycloheptyl group, and the like. Cyclohexyl group is preferable among these groups.

$R^6$ in formula (2) and formula (3) represents an oxygen atom, methylene group, or methylene group having substituents. Examples of the substituent include methyl group, ethyl group, propyl group, and the like. $R^6$ is preferably an oxygen atom or methylene group.

$R^7$ in formula (2) and formula (3) represents an aliphatic hydrocarbon group having 1 to 20, preferably 1 to 10, carbon atoms. Examples of the aliphatic hydrocarbon group include methyl group, ethyl group, propyl group, butyl group, pentyl group, hexyl group, octyl group, and the like. Methyl group, ethyl group, propyl group, and butyl group are most preferable among these groups.

In formula (1), formula (2), and formula (3), x represents an integer of 1 to 3, y represents an integer of 1 to 3, z represents an integer of 0 to 2, and x+y and x+y+z each represent an integer of 2 to 4. When x represents 1, y represents 1 to 3. When x represents 2, y represents 1 to 2. When x represents 3, y represents 1. In formula (2) and formula (3), the relation between x and y is decided in accordance with the value of z which is 0 to 2. In the process for producing the functionalized polymer of the present invention which will be described later, x and y in formula (1) and x, y and z in formula (2) and formula (3) are not particularly limited, but can each vary within a range satisfying the conditions described above. The functionalized polymer may be a single compound having fixed values of x and y in formula (1) or fixed values of x, y, and z in formula (2) and formula (3), or a mixture of compounds having various values of x and y in formula (1) or various values of x, y, and z in formula (2) and formula (3). A mixture is generally used.

In formula (2) and formula (3), n represents 0 or 1. This means that $>R^5—(CH_2)_n—OH$ represents either $>R^5—CH_2—OH$ or $>R^5—OH$. When $R^5$ represents an aliphatic hydrocarbon group, $R^5$ represents a group in which n represents either 0 or 1, or a mixture of a group in which n represents 0 and a group in which n represents 1. When $R^5$ is an alicylic hydrocarbon, n is 0 and $R^5$ can have the structure of $>R^5—OH$ alone.

The functionalized polymer of the present invention has a molecular structure comprising a combination of the molecular elements described above. In order to further improve various properties and remarkably increase the interaction with silica when an elastomeric composition comprising the functionalized polymer is formed as described later, the functionalized polymer preferably has a more specific molecular structure represented by formula (1), formula (2), or formula (3), each comprising the following specific molecular elements.

When the functionalized polymer is represented by formula (1): $R^1$ and $R^2$ each represent a group selected from an aliphatic hydrocarbon group, an alicyclic hydrocarbon group, and an aromatic hydrocarbon group, each having 13 or less carbon atoms, and a part forming a residue group of an imine compound which has a structure formed by bonding $R^1$ and $R^2$ to each other, contains the nitrogen atom bonded therebetween, and has 2 to 13 carbon atoms; $R^3$ represents a group selected from an aliphatic group and an aromatic hydrocarbon, each having 10 or less carbon atoms; and $R^4$ represents a group selected from an aliphatic hydrocarbon group having 1 to 3 carbon atoms and phenyl group.

When the functionalized polymer is represented by formula (2): $R^1$ and $R^2$ each represent a group selected from an aliphatic hydrocarbon group, an alicyclic hydrocarbon group, and an aromatic hydrocarbon group, each having 13 or less carbon atoms, and a part forming a residue group of an imine compound which has a structure formed by bonding $R^1$ and $R^2$ to each other, contains the nitrogen atom bonded therebetween, and has 2 to 13 carbon atoms; $R^3$ represents a group selected from an aliphatic hydrocarbon group and an aromatic hydrocarbon group, each having 10 or less carbon atoms; $R^4$ represents a group selected from an aliphatic hydrocarbon group having 1 to 3 carbon atoms and phenyl group; $R^5$ represents a group selected from an aliphatic hydrocarbon group and an aliphatic hydrocarbon group, each having 6 or less carbon atoms; $R^6$ represents an oxygen atom or methylene group; and $R^7$ represents a group selected from aliphatic hydrocarbon groups having 1 to 4 carbon atoms.

When the functionalized polymer is represented by formula (3): a hydrogen atom is bonded to one end part of the molecule; $R^3$ represents a group selected from an aliphatic hydrocarbon group and an aromatic hydrocarbon group, each having 10 or less carbon atoms; $R^4$ represents a group selected from an aliphatic hydrocarbon group having 1 to 3 carbon atoms and phenyl group; $R^5$ represents a group selected from an aliphatic hydrocarbon group and an alicyclic hydrocarbon group, each having 6 or less carbon atoms; $R^6$ represents an oxygen atom or methylene group; and $R^7$ represents a group selected from aliphatic hydrocarbon groups having 1 to 4 carbon atoms.

Preferable examples of the functionalized polymer represented by formula (1) include functionalized polymers having molecular structures in which all combinations of the following specific diene-type polymers P and specific groups $R^1$, $R^2$, $R^3$, and $R^4$ are included.

P: polybutadiene and butadiene/styrene copolymer $R^1$ and $R^2$ as $R^1R^2N$: diethylamino group, dioctylamino group, hexamethyleneimino group, dodecamethyleneimino group, and piperidino group $R^3$: methyl group, ethyl group, propyl group, and phenyl group $R^4$ optionally: methyl group, ethyl group, and phenyl group.

Preferable examples of the functionalized polymer represented by formula (2) include functionalized polymers having molecular structures in which all combinations of the following specific diene-type polymers P and specific groups $R^1$, $R^2$, $R^3$, $R^4$, $R^5$, $R^6$, and $R^7$ are included.

P: polybutadiene and butadiene/styrene copolymer $R^1$ and $R^2$ as $R^1R^2N$: dioctylamino group, hexamethyleneimino group, dodecamethyleneimino group, and piperidino group $R^3$: methyl group, ethyl group, propyl group, and phenyl group $R^4$ optionally: methyl group, ethyl group, and phenyl group $R^5$: methyl group and cyclohexyl group $R^6$: an oxygen atom and methylene group $R^7$: methyl group, ethyl group, and propyl group Preferable examples of the functionalized polymer represented by formula (3) include functionalized polymers having molecular structures in which all combinations of the following specific diene-type polymers P and specific groups $R^3$, $R^4$, $R^5$, $R^6$, and $R^7$ are included.

P: polybutadiene and butadiene/styrene copolymer $R^3$: methyl group, ethyl group, propyl group, and phenyl group $R^4$ optionally: methyl group, ethyl group, and phenyl group $R^5$: methyl group and cyclohexyl group $R^6$: an oxygen atom and methylene group $R^7$: methyl group, ethyl group, and propyl group $R^4$ may be present or absent in the molecule. "$R^4$ optionally" in the above description means that the listed groups are used for the combinations when $R^4$ is present in the molecule. $R^4$ is absent in the molecule when x+y=4 in formula (1), and when x+y+z=4 in formula (2) and formula (3).

Specific examples of the molecular structure of the functionalized polymer are shown in the following examples of preparation of the functionalized polymer.

The method of preparation of the functionalized polymer of the present invention is not particularly limited, and is described hereinafter with reference to the examples.

The functionalized polymer represented by formula (1) of the present invention can be obtained by steps of initiating polymerization of a monomer by using a lithium amide initiator which is prepared from a secondary amine compound, such as diethyl amine, or an imine compound, such as hexamethyleneimine, and an organolithium compound, and adding an alkoxysilane compound, an aryloxysilane compound and/or an aralkyloxysilane compound to the solution of the polymer having a lithium active end obtained in the step of polymerizing.

As another method, the functionalized polymer represented by formula (1) of the present invention can be obtained also by steps of adding a secondary amine compound or an imine compound at least in the presence of a monomer, then adding an organolithium compound to allow polymerization of the monomer with a lithium amide initiator to proceed, and finally adding an alkoxysilane compound, an aryloxysilane compound and/or an aralkyloxysilane compound to the solution of the polymer having a lithium active end obtained in the step of polymerizing.

The latter method is preferable with respect to the handling stability of the initiator components used for the preparation of the functionalized polymer, efficiency of the initiation, reproducibility, and reactivity of the coupling reaction.

In Preparation Example A illustrated hereinafter, the functionalized polymer represented by formula (1) is prepared by the above-described latter method. Butadiene (B) and styrene (S) are used as the monomers (the copolymer obtained is referred to as BSP.), diethylamine (DEA) is used as the secondary amine compound, and methyltriethoxysilane (MTEOS) is used as the alkoxysilane. The resultant functionalized polymers are referred to as A-1 and/or A-2. In Preparation Example B also illustrated hereinafter, the same materials as those in Preparation Example A are used except that hexamethyleneimine (HMI) is used as the imine compound in place of DEA, and tetraphenoxysilane (TPOS) is used in place of MTEOS. The resultant functionalized polymers are referred to as B-1, B-2 and/or B-3.

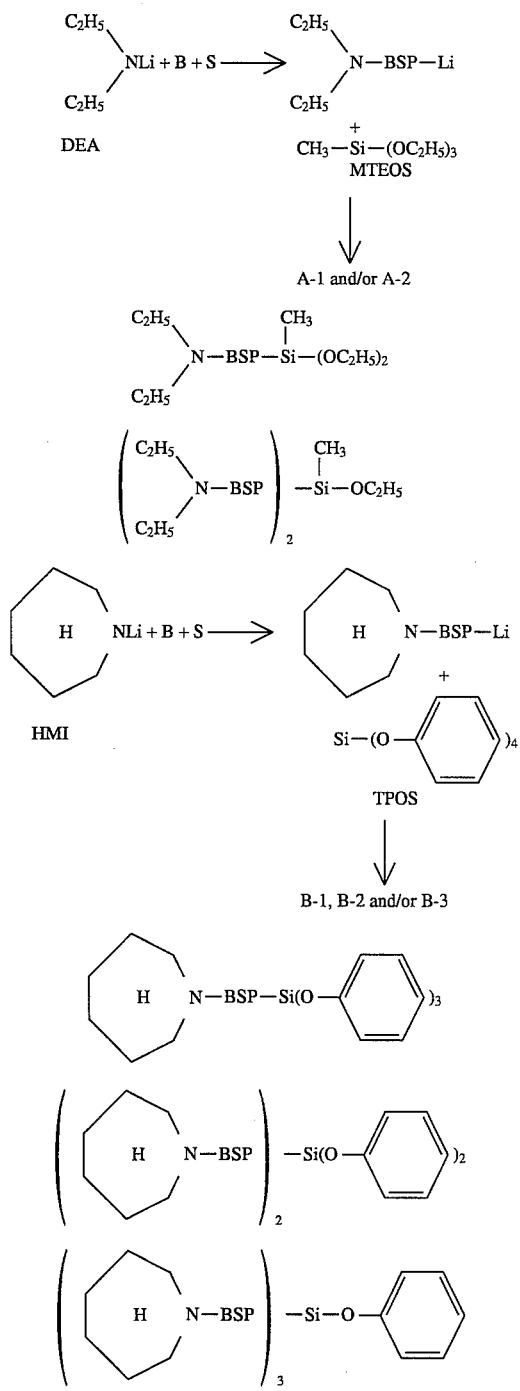

The secondary amine compound and the imine compound used in the preparation of the fuctionalized polymer represented by formula (1) of the present invention are the same as those described above.

The alkoxysilane compound, arloxysilane compound and/or aralkyloxysilane compound used in the preparation of the functionalized polymer represented by formula (1) of the present invention is a compound used for forming the part $—Si(R^4_{4-(x+y)})—(OR^3)_y$ in the molecular structure represented by formula (1). The alkoxysilane compound, aryloxysilane compound and/or aralkyloxysilane compound are not particularly limited and a tetraalkoxysilane compound, an alkylalkoxysilane compound, an arylalkoxysilane compound, an alkenylalkoxysilane compound, a halogenoalkoxysilane compound, or the like can be used. In the present description an alkoxy group, an aryloxy group, and an aralkyloxy group are those in which the hydrocarbon group replacing the hydrogen atom of the hydroxyl group is an aliphatic hydrocarbon group, an aromatic hydrocarbon group, and an aralkyl hydrocarbon group, respectively.

Examples of the tetraalkoxysilane compound described above include tetramethoxysilane, tetraethoxysilane, tetra-n-propoxysilane, tetra-n-butoxysilane, tetra(2-ethylhexanoxy)silane, tetraphenoxysilane, tetratoluyloxysilane, and the like.

Examples of the alkylalkoxysilane compound described above include methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, and the like.

Examples of the arylalkoxysilane compound described above include phenyltrimethoxysilane, phenyltriethoxysilane, phenyltri-n-propoxysilane, phenyltri-n-butoxysilane, phenyltriphenoxysilane, and the like.

Examples of the alkenylalkoxysilane compound described above include vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, styryltrimethoxysilane, and the like.

Examples of the halogenoalkoxysilane compound described above include trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and the like.

In the functionalized polymers represented by formula (2) and formula (3) of the present invention, the process for preparing the functionalized polymer represented by formula (2), in which the diene-type polymer has a nitrogen atom at the end, differs from the process for preparing the functionalized polymer represented by formula (3), in which the diene-type polymer has a hydrogen atom at the end, only in that a process for introducing a nitrogen atom is included in the process for preparing the functionalized polymer of formula (2).

The functionalized polymer represented by formula (2) can be obtained by steps of initiating polymerization of a monomer by using a lithium amide initiator which is prepared from a secondary amine compound, such as diethylamine, or an imine compound, such as hexamethyleneimine, and an organolithium compound, and adding an alkoxysilane compound having an epoxy group, an aryloxysilane compound having an epoxy group and/or an aralkyloxysilane compound having an epoxy group, such as a glycidyloxy group, to the solution of the polymer having a lithium active end obtained in the step of polymerizing.

As another method, the functionalized polymer represented by formula (2) can be obtained by steps of adding a secondary amine compound or an imine compound at least in the presence of a monomer to allow polymerization of the monomer with a lithium amide to proceed, and adding an alkoxysilane compound having an epoxy group, an aryloxysilane compound having an epoxy group and/or an aralkyloxysilane compound having an epoxy group, such as a glycidoxy group, to the solution of the polymer having a lithium active end obtained in the step of polymerizing. The functionalized polymer represent by formula (3) can be obtained by the same methods as those to obtain the functionalized polymer represented by formula (2) except that an organolithium compound (for example, butyllithium) is used alone and neither a secondary amine nor an imine compound (for example HMI) is used.

In Preparation Example C illustrated hereinafter, the functionalized polymer represented by formula (2) is prepared by the above-described latter method. Butadiene (B) and styrene (S) are used as the monomers (the copolymer obtained is referred to as BSP.), hexamethyleneimine (HMI) is used as the imine compound, and 3-glycidoxypropyltrimethoxysilane (GPMOS) is used as the alkoxysilane compound having an epoxy group. The resultant functionalized polymers are referred to as C-1, C-2 and/or C-3. In Preparation Example D also illustrated hereinafter, the same materials as those in Preparation Example C are used except that β-(3,4-epoxycyclohexyl)ethyltrimethoxysilane (EHMOS) is used in place of GPMOS. The resultant functionalized polymers are referred to as D-1, D-2 and/or D-3.

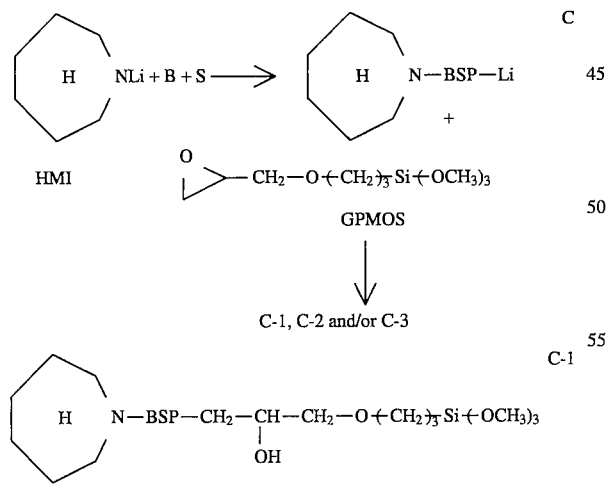

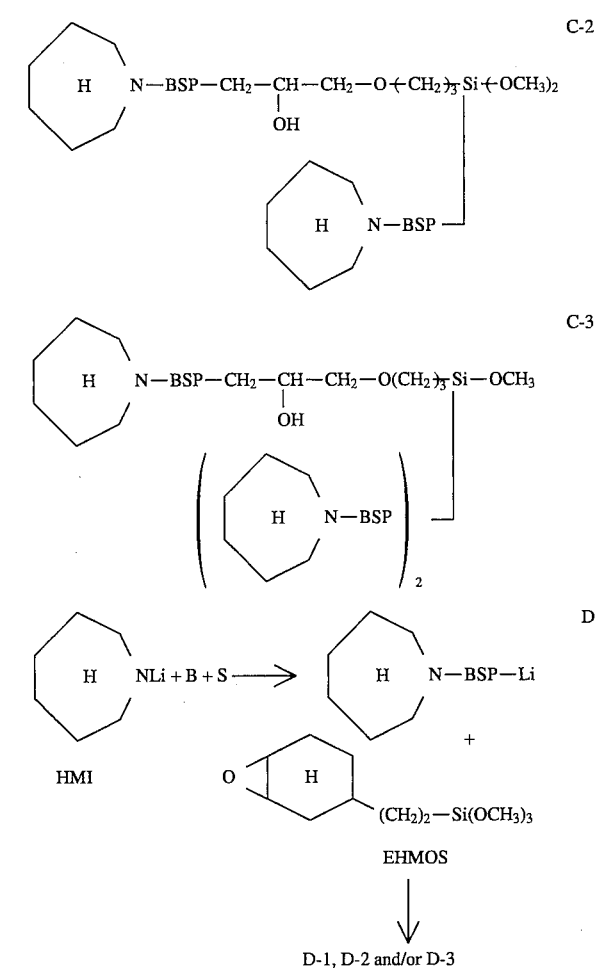

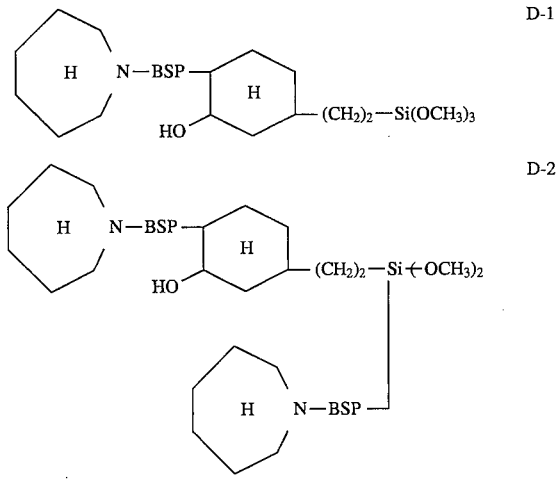

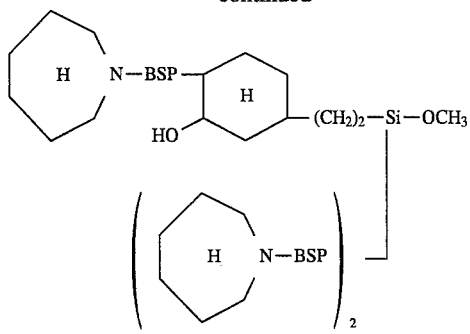

D-3

In the structures of C-1, C-2, and C-3 obtained in Preparation Example C, the structure —$CH_2$—$CH(OH)$—$CH_2$— may be replaced by the structure —$CH(CH_2$—$OH)$—$CH_2$—. A mixed structure of these structures may be contained in C-1, C-2, and C-3.

The secondary amine compound and the imine compound used in the preparation of the functionalized polymer represented by formula (2) of the present invention are the same as those described above.

Examples of the alkoxysilane, aryloxysilane and aralkyloxysilane compounds having an epoxy group include 3-glycidoxyethyltrimethoxysilane, 3-glycidoxypropyltrimethoxysilane, 3-glycidoxybutyltrimethoxysilane, 3-glycidoxypropyltriethoxysilane, 3-glycidoxypropyltripropoxysilane, 3-glycidoxypropyltributoxysilane, 3-glycidoxypropyltriphenoxysilane, 3-glycidoxypropylmethyldimethoxysilane, 3-glycidoxypropylethyldimethoxysilane, 3-glycidoxypropylethyldiethoxysilane, 3-glycidoxypropylmethyldiethoxysilane, 3-glycidoxypropylmethyldipropoxysilane, 3-glycidoxypropylmethyldibutoxysilane, 3-glycidoxypropylmethyldiphenoxysilane, 3-glycidoxypropyldimethylmethoxysilane, 3-glycicloxypropyldiethylethoxysilane, 3-glycidoxypropyldimethylethoxysilane, 3-glycidoxypropyldimethylphenoxysilane, 3-glycidoxypropyldiethylmethoxysilane, 3-glycidoxypropylmethyldiisopropeneoxysilane, bis(3-glycidoxypropyl)dimethoxysilane, bis(3-glycidoxypropyl)diethoxysilane, bis(3-glycidoxypropyl)dipropoxysilane, bis(3-glycidoxypropyl)dibutoxysilane, bis(3-glycidoxypropyl)diphenoxysilane, bis(3-glycidoxypropyl)methylmethoxysilane, bis(3-glycidoxypropyl)methylethoxysilane, bis(3-glycidoxypropyl)methylpropoxysilane, bis(3-glycidoxypropyl)methylbutoxysilane, bis(3-glycidoxypropyl)methylphenoxysilane, tris(3-glycidoxypropyl)methoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, β-(3,4-epoxycyclohexyl)propyltrimethoxysilane, β-(3,4-epoxycyclohexyl)ethylmethyldimethoxysilane, β-(3,4-epoxycyclohexyl)ethylethyldimethoxysilane, β-(3,4-epoxycyclohexyl)ethylethyldiethoxysilane, β-(3,4-epoxycyclohexyl)ethylmethyldiethoxysilane, β-(3,4-epoxycyclohexyl)ethylmethyldipropoxysilane, β-(3,4-epoxycyclohexyl)ethylmethyldibutoxysilane, β-(3,4-epoxycyclohexyl)ethylmethyldiphenoxysilane, β-(3,4-epoxycyclohexyl)ethyldimethylmethoxysilane, β-(3,4-epoxycyclohexyl)ethyldiethylethoxysilane, β-(3,4-epoxycyclohexyl)ethyldimethylethoxysilane, β-(3,4-epoxycyclohexyl)ethyldimethylpropoxysilane, β-(3,4-epoxycyclohexyl)ethyldimethylbutoxysilane, β-(3,4-epoxycyclohexyl)ethyldimethylphenoxysilane, β-(3,4-epoxycyclohexyl)ethyldiethylmethoxysilane, β-(3,4-epoxycyclohexyl)ethylmethyldiisopropeneoxysilane, and the like. Among these silane compounds, 3-glycidoxypropyltrimethoxysilane is preferable.

The polymerization solvent used in the method of preparation is not particularly limited. Examples of the polymerization solvent include aromatic hydrocarbon solvents, such as benzene, toluene, xylene, and the like; aliphatic hydrocarbon solvents, such as n-pentane, n-hexane, n-butane, and the like; alicyclic hydrocarbon solvents, such as methylcyclopentane, cyclohexane, and the like; and mixtures of these solvents.

Examples of the lithium compound used in the method of preparation as the polymerization initiator include alkyllithiums, such as n-butyllithium, ethyllithium, propyllithium, t-butyllithium, hexyllithium, and the like; alkylene dilithiums, such as 1,4-dilithiobutane, and the like; phenyllithium; stilbenedilithium; and other organolithium compounds, such as reaction products of butyllithium and divinylbenzene, and the like; organometallic lithium compounds, such as tributyltin lithium, and the like; and lithium amides, such as lithium hexamethyleneimide, lithium diethylamide, lithium pyrrolidide, and the like. The lithium initiator may be used singly or as a mixture of two or more types. When an alkyllithium is used, for example, in combination with a secondary amine compound or an imine compound as the initiator in the preparation of the functionalized polymer represented by formula (1) or formula (2), n-butyllithium and sec-butyllithium are preferably used as the alkyllithium because of better solubility in hydrocarbon solvents and a more suitable initiation rate. When a lithium amide itself is directly used as the initiator, lithium hexamethyleneimide, lithium pyrrolidide, and lithium diethylamide are preferable because of better solubility in hydrocarbon solvents and better reinforcing property with a white carbon such as silica. The lithium compound can be used in an amount in a range of 0.2 to 30 mmol per 100 g of the monomer. An amount of less than 0.2 mmol or more than 30 mmol is not preferable with respect to the processability of the resultant polymer.

The conjugated diene monomer and the vinyl aromatic hydrocarbon monomer used in the polymerization are the same as those described above.

In the present polymerization, a randomizer is preferably used in order to obtain a polymer having a desired molecular structure. The randomizer is a compound which controls, for example: the microstructure of a conjugated diene polymer, such as the amount of the 1,2-linkage in polybutadiene or in the butadiene part of a butadienestyrene copolymer, and the amount of the 3,4-linkage in polyisoprene; and the distribution of monomer units in a conjugated diene-vinyl aromatic hydrocarbon copolymer, such as randomization of the butadiene unit and the styrene unit in a butadiene-styrene copolymer. The randomizer used in the present invention is not particularly limited, and all types of generally used randomizer may be used. Examples of the randomizer include:

(1) ethers;

(2) ortho-dimethoxybenzenes;

(3) complexes of alkali metals and ketones or phosphorous acid triesters;

(4) compounds represented by the following formulae:

wherein R is selected from an aliphatic hydrocarbon group, an alicyclic hydrocarbon group, and an aromatic hydrocarbon group, $M^1$ represents an alkali metal, such as lithium, sodium, potassium, rubidium, or cesium, $M^2$ represents an alkaline earth metal, such as calcium or barium, and n is an integer of 1 to 3;

(5) tertiary amine.

The randomizer is described more specifically hereinafter. The randomizer may be used singly or as a combination of two or more types.

(1) Examples of the ether include: 1,2-dimethoxyethane, 1,2-diethoxyethane, tetrahydrofuran, 2-methoxymethyltetrahydrofuran, diethyl ether, triethylene glycol dimethyl ether, and the like.

(2) Examples of the ortho-dimethoxybenzene include: veratrol, isohomoveratrol, and the like.

(3) Examples of the complex of an alkali metal and a ketone or a phosphorous acid triester include: complexes of alkali metals, such as lithium, sodium, potassium, rubidium, cesium, and the like, and ketones, such as acetone, methyl ethyl ketone, diisopropyl ketone, benzophenone, acetophenone, dibenzyl ketone, fluorenone, xanthone, Michler's ketones, acetylacetone, and the like, or phosphorous acid triesters, such as triethyl phosphite, trioctyl phosphite, tribenzyl phosphite, trinonyl phosphite, and the like.

(4) The randomizers represented by the general formulae are as follows.

Examples of the alkali metal salt or the alkaline earth metal salt of an alcohol or a phenol represented by the general formula $R(OM^1)_n$ or $(RO)_2M^2$ include: salts of lithium, sodium, potassium, rubidium, cesium, calcium, or barium, and methyl alcohol, ethyl alcohol, isopropyl alcohol, tert-butyl alcohol, tert-amyl alcohol, cyclohexyl alcohol, allyl alcohol, 2-butenyl alcohol, benzyl alcohol, phenol, catechol, resorcinol, hydroquinone, 1-naphthyl alcohol, p-nonylphenol, pyrrogalol, or the like.

Examples of the alkali metal salt of a carboxylic acid or a hydrogen carbonic acid ester represented by the general formula $(COOM^1)_n$ or $ROCOOM^1$ include: salts of lithium, sodium, potassium, rubidium, or cesium, and isovaleric acid, lauric acid, palmitic acid, stearic acid, oleic acid, rosic acid, benzoic acid, pimelic acid, dodecyl hydrogen carbonate, phenyl hydrogen carbonate, or the like.

Examples of the sulfonic acid salt or sulfuric acid salt of an alkali metal represented by the general formula $RSO_3M^1$ or $ROSO_3M^1$ include: salts of lithium, sodium, potassium, rubidium, or cesium, and dodecylbenzenesulfonic acid, diisopropylnaphthalenesulfonic acid, N-methyl-N-methanesulfonic acid salt laurylamide, sulfuric acid ester salts of lauryl alcohol, caproyl ethylene glycol sulfuric acid esters, and the like.

(5) Examples of the tertiary amine include: triethylamine, tetramethylethylenediamine, and the like.

Among these randomizers, (1) ethers, and (4) $R(OM^1)_n$ are preferable because the molecular structure of the diene-type polymers of the present invention can be controlled more easily by these randomizers.

The randomizer is used in an amount of 0.01 to 1000 mol equivalent per 1 mol equivalent of the organolithium compound.

The temperature of the polymerization is generally $-20°$ to $150°$ C., preferably $0°$ to $100°$ C.

The concentration of the monomer in the solution is generally 5 to 50% by weight, preferably 10 to 35% by weight. When a conjugated diene and a vinyl aromatic hydrocarbon are copolymerized, the content of the vinyl aromatic hydrocarbon in the initial monomer mixture is 5 to 70% by weight, preferably 10 to 50% by weight.

The polymerization is conducted by bringing the monomers into contact with the initiator in the liquid phase. The polymerization is preferably carried out at a pressure essentially sufficient for keeping the polymerization system at the liquid phase. It is preferred that any substances having an adverse effect on the catalytic function are excluded from all of the materials used in the reaction system. The reaction by addition of an alkoxysilane, aryloxysilane and/or aralkyloxysilane compound or an alkoxysilane, aryloxysilane and/or aralkyloxysilane compound having an epoxy group is conducted after the polymerization in an atmosphere in which the lithium active end of the polymer or the copolymer is not deactivated.

After finishing the reaction, the functionalized polymer can be obtained by removing the solvent by blowing steam into the solution of the functionalized polymer, or by coagulating the functionalized polymer by addition of a poor solvent such as methanol, followed by drying with heated rolls or under a vacuum. The functionalized polymer can be obtained by removing the solvent directly from the solution of the functionalized polymer using heated rolls or under a vacuum, as well.

In the rubber material comprised in the elastomeric composition of the present invention, the functionalized polymer described above is used by blending with natural rubber or other synthetic rubbers for practical purposes. When the functionalized polymer is used as a blend, it is necessary that the rubber material contains 10 parts by weight or more, preferably 40 parts by weight or more, of the functionalized polymer described above in 100 parts by weight of the rubber material. For example, when the content of the functionalized polymer of the present invention in a blend with natural rubber is less than 10 parts by weight, the balance in the properties required for the elastomeric composition of the present invention deteriorate, and accordingly, such a content is not preferable.

Examples of the synthetic rubber used for blending with the functionalized polymer include cis-1,4-polyisoprene, styrene-butadiene copolymer, low cis-1,4-polybutadiene, high cis-1,4-polybutadiene, ethylene-propylene-diene terpolymer, chloroprene rubber, halogenated butyl rubber, acrylonitrile-butadiene rubber (NBR), and the like. Among these rubbers, natural rubber, high cis-1,4-polybutadiene, and halogenated butyl rubber are preferable from the standpoints of tensile strength, abrasion resistance, and processability.

Fillers are comprised in the elastomeric composition of the present invention. White carbon is the essential component of the filler.

Examples of the white carbon used in the elastomeric composition of the present invention include wet silica (hydrated silicic acid), dry silica (anhydrous silicic acid), calcium silicate, aluminum silicate, clay, talc, calcium carbonate, basic magnesium carbonate, hydrated alumina, diatomaceous earth, barium sulfate, mica, aluminum sulfate, titanium oxide, and the like. Among these white carbons, wet silica is preferable because the fracture properties are improved, and wet grip and low rolling resistance are simultaneously exhibited most remarkably.

The content of the filler in the elastomeric composition is 10 to 100 parts by weight, preferably 20 to 60 parts by weight, based on 100 parts by weight of the rubber material. When the content is less than 10 parts by weight, the fracture properties are insufficient. When the content is more than 100 parts by weight, processability is inferior.

The filler of the present invention may contain the white carbon alone. In this case, the content of the white carbon in the elastomeric composition is 10 to 100 parts by weight, preferably 20 to 60 parts by weight, based on 100 parts by weight of the rubber material. When the content is less than 10 parts by weight, the fracture properties are insufficient. When the content is more than 100 parts by weight, processability is inferior.

The filler of the present invention may contain the white carbon and carbon black in combination. The effect of the filler on the improvement of the physical properties is remarkably enhanced by this combination. As the carbon black, FEF, SRF, HAF, ISAF, SAF, and the like, are used. Carbon blacks having an iodine adsorption number (IA) of 60 mg or more per g, and a dibutyl phthalate absorption number (DBP) of 80 ml or more per 100 g, are preferably used. HAF, ISAF and SAF having superior abrasion resistance are particularly preferable. The amount of the carbon black used is not particularly limited as long as it is within such a range that the effect of the white carbon is not adversely affected. From the standpoints of the reinforcing property and processability, it is preferred that 0.1 to 90 parts by weight of the carbon black and 9.9 to 99.9 parts by weight of the white carbon, each based on 100 parts by weight of the rubber material, are used as long as the content of the filler is within the range described above.

In the elastomeric composition of the present invention, a silane coupling agent may be used in the preparation of the elastomeric composition for the purpose of further enhancing the reinforcement with the white carbon.

Examples of the silane coupling agent include: bis(3-triethoxysilylpropyl)tetrasulfide, bis(2-triethoxysilylethyl)tetrasulfide bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazol tetrasulfide, 3-triethoxysilylpropylbenzothiazol tetrasulfide, 3-triethoxysilylpropyl methacrylate monosulfide, 3-trimethoxysilylpropyl methacrylate monosulfide, and the like. Among these compounds, bis(3-triethoxysilylpropyl)tetrasulfide, 3-trimethoxysilylpropylbenzothiazol tetrasulfide, and the like, are preferable from the standpoint of improving the reinforcing property. Other examples of the silane coupling agent include: bis(3-diethoxymethylsilylpropyl) tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethylthiocarbamoyl tetrasulfide, dimethoxymethylsilylpropylbenzothiazol tetrasulfide, and the like.

When a silane coupling agent is used in the preparation of the elastomeric composition, the amount of the silane coupling agent can be made lower than that in conventional rubber compositions while the properties remain the same as those of the conventional rubber compositions. The amount of the silane coupling agent is varied depending on the amount of the white carbon used, and, from the standpoint of the reinforcing property, the amount is generally 0.1 to 10 parts by weight, preferably 0.1 to 5 parts by weight, based on 100 parts by weight of the rubber material.

Examples of the vulcanizing agent include sulfur and the like. The amount of the vulcanizing agent used is 0.1 to 5 parts by weight, preferably 1 to 2 parts by weight, based on 100 parts by weight of the rubber material. When the amount is less than 0.1 parts by weight, the fracture properties, abrasion resistance, and low hysteresis loss of the vulcanized rubber are inferior. When the amount is more than 5 parts by weight, the rubber elasticity is lost.

Examples of the process oil which can be used in the elastomeric composition of the present invention include paraffinic process oils, naphthenic process oils, and aromatic process oils. For applications in which tensile strength and abrasion resistance are important, aromatic process oils are used. For applications in which hysteresis loss and low temperature properties are important, naphthenic process oils and paraffinic process oils are used. The amount of the process oil used is 0 to 100 parts by weight based on 100 parts by weight of the rubber material. When the amount is more than 100 parts by weight, tensile strength and low hysteresis loss of the vulcanized rubber deteriorate significantly.

Vulcanization accelerators used in the present invention are not particularly limited. Examples of the vulcanization accelerator include thiazol vulcanization accelerators, such as M (2-mercaptobenzothiazol), DM (dibenzothiazyl disulfide), CZ (N-cyclohexyl-2-benzothiazylsulfenamide) and the like; and guanidine vulcanization accelerators, such as DPG (diphenylguanidine) and the like. The amount of the vulcanization accelerator used is 0.1 to 5 parts by weight, preferably 0.2 to 3 parts by weight, based on 100 parts by weight of the rubber material.

In the elastomeric composition of the present invention, additives, such as antioxidants, zinc oxide, stearic acid, antiozonants, and the like which are conventionally used in the rubber industry may be comprised.

The elastomeric composition of the present invention can be obtained by milling the components by using a milling apparatus, such as a mill, an internal mixer, and the like. After being molded and vulcanized, the elastomeric composition may be applied to tires, such as tire treads, undertreads, carcasses, side walls, beads, and the like, as well as to other industrial rubbers, such as antivibration rubbers, belts, hoses, and the like. The elastomeric composition is particularly preferably used as a rubber for tire treads.

To summarize the advantages of the present invention, the functionalized polymer and the elastomeric composition of the present invention exhibit excellent fracture properties, abrasion resistance, and low hysteresis loss (low rolling resistance and low fuel consumption) because the functionalized polymer and the elastomeric composition have the structure and the composition described above.

EXAMPLES

The invention will be understood more readily with reference to the following examples; however, these examples are intended to illustrate the invention and are not to be construed as limiting the scope of the invention.

In the examples, part and % mean part by weight and % by weight, respectively, unless otherwise mentioned.

Measurements were conducted in accordance with the following methods:

The number-average molecular weight ($M_n$) and the weight-average molecular weight ($M_w$) of the copolymer were measured by gel permeation chromatography (GPC) (an instrument: HLC-8020, a product of Toso Co., Ltd.; columns: GMH-XL, two columns in the series arrangement, a product of Toso Co., Ltd.) using differential refractive index (RI) and were calibrated to polystyrene using monodisperse polystyrene samples as the references.

The microstructure of the polybutadiene part of the polymer was obtained by Morero's method. The content of the bound styrene in a butadiene-styrene copolymer was obtained from the integration ratio in the $^1$H-NMR spectrum.

The Mooney viscosity of the elastomeric composition was measured in accordance with the method of Japanese Industrial Standard K6300 at 130° C.

As the index for hysteresis loss and rolling resistance of a vulcanizate of the elastomeric composition, tan δ (50° C.) was used. An elastomeric composition having a smaller tan δ was evaluated as having a lower hysteresis loss and a lower rolling resistance. Measurement of tan δ (50° C.) was conducted by using a viscoelasticity measurement apparatus (a product of Rheometrix Company) at a temperature of 50° C., a strain of 8%, and a frequency of 15 Hz. Measurement of tan δ (0° C.) as the index for the wet grip was conducted by using the same apparatus at a temperature of 0° C., a strain of 1%, and a frequency of 15 Hz.

Fracture properties and 300% modulus ($M_{300}$) were measured in accordance with the method of Japanese Industrial Standard K6301. Abrasion resistance was measured by using a Lambourn abrasion tester at room temperature with a slip rate of 60%. The abrasion resistance of the elastomeric composition was compared with that of the reference composition which contained the same components except that 50 parts by weight of HAF carbon was used as the filler in the reference composition, and was expressed as an index based on the value of the reference composition set to 100.

Example 1

Into a 800 ml pressure-resistant glass vessel dried and purged with nitrogen, 315 g of cyclohexane, 36 g of butadiene monomer, 24 g of styrene monomer, 0.025 mmol of potassium t-amylate, and 0.5 mmol of di-n-hexylamine (DHA) were added in accordance with the formulation shown in Table 1. To this mixture, 0.5 mmol of n-butyllithium (BuLi) was added and the polymerization was conducted at 50° C. for 2 hours. The polymerization system was homogeneous and clear without formation of any precipitates at all throughout the polymerization period from the start to the end of the polymerization. Conversion by the polymerization was about 100%. (This method is described in Japanese Patent Application Laid-Open No. Heisei 6(1994)-199921.) A portion of the copolymer was removed as a sample, and isopropyl alcohol was added thereto. The solid product formed was dried to obtain a rubbery copolymer. The microstructure and molecular weight of the copolymer thus obtained were measured. The copolymer obtained in Example 1 as well as copolymers obtained in Examples 2 to 4 and Comparative Examples 1 to 6, which will be explained hereinafter, each had a content of the bound styrene of 39 to 41%, and a vinyl content of the butadiene part of 14 to 16%. The copolymers before modification with an alkoxysilane each had a weight-average molecular weight of $20 \times 10^4$ to $22 \times 10^4$ and a molecular weight distribution of 1.05 to 1.12.

To the polymerization solution obtained above, methyltriethoxysilane (MTEOS) was added as the alkoxysilane compound, and the modification was conducted at 60° C. for 30 minutes. Isopropyl alcohol was added to this solution and the solid product formed was dried to obtain a rubbery functionalized polymer G-1. It was confirmed that the functionalized polymer obtained here was a mixture of A-1 and A-2 which were the functionalized polymers obtained in Preparation Example A described above. The functionalized polymer in Example 1, as well as the functionalized polymers in Examples 2 to 4 and Comparative Examples 2 to 4 obtained after the modification by addition of an alkoxysilane compound to the copolymers, each had a weight-average molecular weight of $31 \times 10^4$ to $43 \times 10^4$. On the other hand, the functionalized polymers obtained in Comparative Examples 1, 5 and 6 each had a weight-average molecular weight of $20 \times 10^4$ to $22 \times 10^4$.

The functionalized polymer G-1 was milled with other components in accordance with the formulation shown in Table 2, and the composition was vulcanized at 145° C. for 33 minutes. The physical properties of the vulcanizate thus obtained were evaluated. Results are shown in Table 3.

Example 2

A rubbery functionalized polymer G-2 was obtained by the same method as that used in Example 1 except that hexamethyleneimine (HMI) was used as the imine compound in place of DHA. It was confirmed that the functionalized polymer obtained here was a mixture of compounds which were the same as A-1 and A-2 obtained in Preparation Example A described above except that the secondary amino groups in A-1 and A-2 were each replaced by a hexamethyleneimino group.

Results of the evaluation of the physical properties of the vulcanizate are shown in Table 3.

Example 3

A rubbery functionalized polymer G-3 was obtained by the same method as that used in Example 1 except that HMI was used in place of DHA and 0.188 mmol of tetraphenoxysilane (TPOS) was used as the alkoxysilane compound in place of MTEOS. It was confirmed that the functionalized polymer obtained here was a mixture of the functionalized polymers B-1, B-2, and B-3 obtained in Preparation Example B described above.

Results of the evaluation of the physical properties of the vulcanizate are shown in Table 3.

Example 4

A rubbery functionalized polymer G-4 was obtained by the same method as that used in Example I except that HMI was used in place of DHA and methyltriphenoxysilane (MTPOS) was used as the alkoxysilane compound in place of MTEOS. It was confirmed that the functionalized polymer obtained here was a mixture of compounds which were the same as B-1, B-2, and B-3 obtained in Preparation Example B described above except that the phenoxysilane groups in B-1, B-2, and B-3 were each replaced by a methylphenoxysilane group.

Results of the evaluation of the physical properties of the vulcanizate are shown in Table 3.

Comparative Example 1

A rubbery polymer G-5 was obtained by the same method as that used in Example 1 except that neither the secondary amine compound DHA nor the alkoxysilane compound MTEOS was used. This polymer was a conventional butadiene-styrene random copolymer.

Results of the evaluation of the physical properties of the vulcanizate are shown in Table 3.

Comparative Example 2

A rubbery polymer G-6 was obtained by the same method as that used in Example 1 except that the secondary amine compound DHA was not used and 0.188 mmol of TPOS was used as the alkoxysilane compound in place of MTEOS. As can be easily understood from Preparation Example B described above, the phenoxysilane group was bonded to this copolymer, but no functional group containing nitrogen was bonded to this copolymer.

Results of the evaluation of the physical properties of the vulcanizate are shown in Table 3.

Comparative Example 3

A rubbery polymer G-7 was obtained by the same method as that used in Example 1 except that the secondary amine compound DHA was not used. As can be easily understood from Preparation Example A described above, the methylethoxysilane group was bonded to this copolymer, but no functional group containing nitrogen was bonded to this copolymer.

Results of the evaluation of the physical properties of the vulcanizate are shown in Table 3.

Comparative Example 4

A rubbery polymer G-8 was obtained by the same method as that used in Example 1 except that the secondary amine compound DHA was not used and MTPOS was used as the alkoxysilane compound in place of MTEOS. As can be easily understood from Preparation Example B described above, the methylphenoxysilane group was bonded to this copolymer, but no functional group containing nitrogen was bonded to this copolymer.

Results of the evaluation of the physical properties of the vulcanizate are shown in Table 3.

Comparative Example 5

A rubbery polymer G-9 was obtained by the same method as that used in Example 1 except that the alkoxysilane compound MTEOS was not used. As can be easily understood from Preparation Example A described above, the dihexylamino group was bonded to this copolymer, but no alkoxysilane group was bonded to this copolymer.

Results of the evaluation of the physical properties of the vulcanizate are shown in Table 3.

Comparative Example 6

A rubbery polymer G-10 was obtained by the same method as that used in Example 1 except that HMI was used as the imine compound in place of DHA and the alkoxysilane compound MTEOS was not used. As can be easily understood from Preparation Example B described above, the hexamethyleneimino group was bonded to this copolymer, but no alkoxysilane group was bonded to this copolymer.

Results of the evaluation of the physical properties of the vulcanizate are shown in Table 3.

TABLE 1

| | monomer | | secondary amine, imine compound | | randomizer | alkoxysilane compound | | functionalized |
|---|---|---|---|---|---|---|---|---|
| | butadiene (g) | styrene (g) | type | amount (mmol) | (KOR) (mmol) | type | amount (mmol) | polymer No. |
| Example 1 | 36 | 24 | DHA | 0.5 | 0.025 | MTEOS | 0.25 | G-1 |
| Example 2 | 36 | 24 | HMI | 0.5 | 0.025 | MTEOS | 0.25 | G-2 |
| Example 3 | 36 | 24 | HMI | 0.5 | 0.025 | TPOS | 0.188 | G-3 |
| Example 4 | 36 | 24 | HMI | 0.5 | 0.025 | MTPOS | 0.25 | G-4 |
| Comparative Example 1 | 36 | 24 | — | — | 0.025 | — | — | G-5 |
| Comparative Example 2 | 36 | 24 | — | — | 0.025 | TPOS | 0.188 | G-6 |
| Comparative Example 3 | 36 | 24 | — | — | 0.025 | MTEOS | 0.25 | G-7 |
| Comparative Example 4 | 36 | 24 | — | — | 0.025 | MTPOS | 0.25 | G-8 |
| Comparative Example 5 | 36 | 24 | DHA | 0.5 | 0.025 | — | — | G-9 |
| Comparative Example 6 | 36 | 24 | HMI | 0.5 | 0.025 | — | — | G-10 |

DHA: dihexylamine
HMI: hexamethyleneimine
KOR: potassium t-amylate
MTEOS: methyltriethoxysilane
TPOS: tetraphenoxysilane
MTPOS: methyltriphenoxysilane

TABLE 2

| rubber material | 100 parts by weight |
|---|---|
| functionalized polymer of the present invention | 75 parts by weight |
| natural rubber | 25 parts by weight |
| silica[1] | 50 parts by weight |
| spindle oil | 5 parts by weight |
| stearic acid | 2 parts by weight |
| Acting SL[2] | 1 parts by weight |
| antioxidant 6C[3] | 1 parts by weight |
| zinc oxide | 3 parts by weight |
| accelerator DPG[4] | 0.6 parts by weight |
| accelerator DM[5] | 1.2 parts by weight |
| sulfur | 1.5 parts by weight |

[1] Nipsil VN3 (trade name), a product of Nippon Silica Kogyo Co., Ltd.
[2] dicyclohexylamine
[3] N-(1,8-dimethylbutyl)-N'-phenyl-p-phenylenediamine
[4] diphenylguanidine
[5] dibenzothiazyl disulfide

TABLE 3

| | functionalized polymer No. | physical properties | | | | | |
|---|---|---|---|---|---|---|---|
| | | tensile strength (kg/cm$^2$) | M$_{300}$ (kg/cm$^2$) | elongation (%) | Lambourn abrasion index[1] | tan δ at 50° C. | tan δ at 0° C. |
| Example 1 | G-1 | 251 | 76 | 550 | 100 | 0.109 | 0.44 |
| Example 2 | G-2 | 259 | 82 | 550 | 105 | 0.100 | 0.44 |
| Example 3 | G-3 | 250 | 72 | 600 | 99 | 0.105 | 0.44 |
| Example 4 | G-4 | 261 | 84 | 550 | 108 | 0.097 | 0.44 |
| Comparative Example 1 | G-5 | 140 | 36 | 650 | 59 | 0.160 | 0.45 |
| Comparative Example 2 | G-6 | 220 | 55 | 640 | 80 | 0.120 | 0.44 |
| Comparative Example 3 | G-7 | 243 | 69 | 580 | 91 | 0.109 | 0.44 |
| Comparative Example 4 | G-8 | 238 | 69 | 640 | 85 | 0.105 | 0.44 |
| Comparative Example 5 | G-9 | 147 | 40 | 670 | 63 | 0.135 | 0.45 |
| Comparative Example 6 | G-10 | 152 | 42 | 680 | 65 | 0.130 | 0.45 |

[1]The abrasion resistance of the elastomer composition was compared with that of the reference composition which contained the same components except that 50 parts by weight of HAF carbon was used as the filler in the reference composition, and was expressed as an index based on the value of the reference composition set to 100.

Example 5

Into a 800 ml pressure-resistant glass vessel dried and purged with nitrogen, 315 g of cyclohexane, 48 g of 1,3-butadiene monomer, 12 g of styrene monomer, and 27.5 mmol of tetrahydrofuran (THiF) were added in accordance with the formulation shown in Table 5. To this mixture, 0.5 mmol of n-butyllithium (BuLi) was added and the polymerization was conducted at 50° C. for 2 hours. Conversion by the polymerization was about 100%. A portion of the copolymer was removed as a sample, and isopropyl alcohol was added thereto. The solid product was dried to obtain a rubbery copolymer. The microstructure and molecular weight of the copolymer thus obtained were measured. Results are shown in Table 6. Then, the molecular weight distribution was measured by using GPC and it was confirmed that the GPC curve had a single sharp peak at $M_w=2\times10^5$ and that the molecular distribution was $M_w/M_n=1.06$.

To the polymer solution obtained above, 3-glycidoxypropyltrimethoxysilane (GPMOS) was added as the alkoxysilane compound having an epoxy group, and the modification was conducted at 60° C. for 30 minutes. Isopropyl alcohol was added to this solution and the solid product formed was dried to obtain a rubbery functionalized polymer G-11. The molecular weight distribution of the functionalized polymer obtained here was measured by GPC. It was confirmed that the GPC curve had two peaks including the peak of the base polymer described above and a peak which is considered to have been obtained by the coupling of two or more polymers, and that the total weight-average molecular weight had jumped to $38\times10^4$. It was confirmed from the results described above and other related data that the functionalized polymer obtained here was a mixture of compounds which were the same as C-1, C-2, and C-3 obtained in Preparation Example C described above except that the hexamethyleneimino groups in C-1, C-2, and C-3 were each replaced by a butyl group. The functionalized polymer obtained here was the polymer represented by formula (3).

The functionalized polymer G-11 was milled with other components in accordance with the formulation shown in Table 2, and the composition was vulcanized at 145° C. for 33 minutes. Physical properties of the vulcanizate thus obtained were evaluated. Results are shown in Table 6.

Example 6

A rubbery functionalized polymer G-12 was obtained by the same method as that used in Example 5 except that the amounts of 1,3-butadiene monomer and styrene monomer were changed, and potassium t-amylate was used in place of THF. This functionalized polymer had the same molecular structure as that of G-11 except that the content of the bound styrene in the copolymer and the vinyl content of the butadiene part were different.

Properties of the copolymer and results of the evaluation of the physical properties of the vulcanizate are shown in Table 6.

Example 7

A rubbery functionalized polymer G-13 was obtained by the same method as that used in Example 5 except that the amounts of 1,3-butadiene monomer and styrene monomer were changed, potassium t-amylate was used in place of THF, and β-(3,4-epoxycyclohexyl)ethyltrimethoxysilane (EHMOS) was used as the alkoxysilane compound having an epoxy group in place of GPMOS. It was confirmed that the functionalized polymer obtained here was a mixture of compounds which were the same as D-1, D-2, and D-3 obtained in Preparation Example D described above except that the hexamethyleneimino groups in D-1, D-2, and D-3 were each replaced by a butyl group [the functionalized polymers represented by formula (3)].

Properties of the copolymer and results of the evaluation of the physical properties of the vulcanizate are shown in Table 6.

Comparative Example 7

A rubbery polymer G-14 was obtained by the same method as that used in Example 5 except that the alkoxysilane compound having an epoxy group GPMOS was not used. This polymer was a conventional butadiene-styrene random copolymer.

Properties of the copolymer and results of the evaluation of the physical properties of the vulcanizate are shown in Table 6.

Comparative Example 8

A rubbery polymer G-15 was obtained by the same method as that used in Example 5 except that methyltriphenoxysilane having no epoxy group was used in place of the alkoxysilane compound having an epoxy group GPMOS. As can be easily understood from Preparation Example C described above, the phenoxysilane group alone was bonded to this copolymer, but neither a functional group containing a hydroxyl group nor a functional group containing nitrogen was bonded to this copolymer.

Properties of the copolymer and results of the evaluation of the physical properties of the vulcanizate are shown in Table 6.

Example 8

Into a 800 ml pressure-resistant glass vessel dried and purged with nitrogen, 315 g of cyclohexane, 48 g of 1,3-butadiene monomer, 12 g of styrene monomer, 27.5 mmol of THF, and 0.5 mmol of hexamethyleneimine (HMI) were added in accordance with the formulation shown in Table 5. To this mixture, n-BuLi was added and the polymerization was conducted at 50° C. for 2 hours. The polymerization system was homogeneous and clear without formation of any precipitates at all throughout the polymerization period from the start to the end of the polymerization. Conversion by the polymerization was about 100%. (This method is described in Japanese Patent Application Laid-Open No. Heisei 6(1994)-199921.)

Then, the copolymer was modified using GPMOS by the same method as that used in Example 5 to obtain a functionalized polymer G-16. It was confirmed that the functionalized polymer obtained here was a mixture of C-1, C-2, and C-3 obtained in Preparation Example C described above [the functionalized polymers represented by formula (2)].

Properties of the copolymer and results of the evaluation of the physical properties of the vulcanizate are shown in Table 6.

Example 9

A rubbery functionalized polymer G-17 was obtained by the same method as that used in Example 8 except that the amounts of 1,3-butadiene monomer and styrene monomer were changed, and potassium t-amylate was used in place of THF. This copolymer had the same molecular structure as that of G-16 except that the content of the bound styrene in the copolymer and the vinyl content of the butadiene part were different.

Properties of the copolymer and results of the evaluation of the physical properties of the vulcanizate are shown in Table 6.

Example 10

A rubbery functionalized polymer G-18 was obtained by the same method as that used in Example 8 except that the amounts of 1,3-butadiene monomer and styrene monomer were changed, potassium t-amylate was used in place of THF, and β-(3,4-epoxycyclohexyl)ethyltrimethoxysilane (EHMOS) was used as the alkoxysilane compound having an epoxy group in place of GPMOS. It was confirmed that the functionalized polymer obtained here was a mixture of D-1, D-2, and D-3 obtained in Preparation Example D described above [the functionalized polymers represented by formula (2)].

Properties of the copolymer and results of the evaluation of the physical properties of the vulcanizate are shown in Table 6.

Comparative Example 9

A rubbery copolymer G-19 was obtained by the same method as that used in Example 8 except that the alkoxysilane compound having an epoxy group GPMOS was not used. This copolymer had the structure of a conventional butadiene-styrene copolymer having the hexamethyleneimino group at the end.

Properties of the copolymer and results of the evaluation of the physical properties of the vulcanizate are shown in Table 6.

TABLE 5

|  | monomer | | imine compound | | randomizer | | silane compound | | functionalized polymer No. |
| --- | --- | --- | --- | --- | --- | --- | --- | --- | --- |
|  | butadiene (g) | styrene (g) | type | amount (mmol) | type | amount (mmol) | type | amount (mmol) |  |
| Example 5 | 48 | 12 | — | — | THF | 27.5 | GPMOS | 0.5 | G-11 |
| Example 6 | 36 | 24 | — | — | KOR | 0.025 | GPMOS | 0.5 | G-12 |
| Example 7 | 36 | 24 | — | — | KOR | 0.025 | EHMOS | 0.5 | G-13 |
| Comparative Example 7 | 48 | 12 | — | — | THF | 27.5 | — | — | G-14 |
| Comparative Example 8 | 48 | 12 | — | — | THF | 27.5 | MTPOS | 0.25 | G-15 |
| Example 8 | 48 | 12 | HMI | 0.5 | THF | 27.5 | GPMOS | 0.5 | G-16 |
| Example 9 | 36 | 24 | HMI | 0.5 | KOR | 0.025 | GPMOS | 0.5 | G-17 |
| Example 10 | 36 | 24 | HMI | 0.5 | KOR | 0.025 | EHMOS | 0.5 | G-18 |
| Comparative Example 9 | 48 | 12 | HMI | 0.5 | THF | 27.5 | — | — | G-19 |

HMI: hexamethyleneimine
KOR: potassium t-amylate
GPMOS: 3-glycidoxypropyltrimethoxysilane
EHMOS: β-(3,4-epoxycyclohexyl)ethyltrimethoxysilane
MTPOS: methyltriphenoxysilane

TABLE 6

(Part 1)

|  | functionalized polymer No. | microstructure styrene (%) | microstructure vinyl (%) | molecular weight $M_w \times 10^{-4}$ | compound $ML_{1+4}$ 130° C. |
|---|---|---|---|---|---|
| Example 5 | G-11 | 20 | 58 | 38 | 67 |
| Example 6 | G-12 | 40 | 12 | 38 | 77 |
| Example 7 | G-13 | 40 | 12 | 37 | 75 |
| Comparative Example 7 | G-14 | 20 | 58 | 20 | 73 |
| Comparative Example 8 | G-15 | 20 | 60 | 34 | 79 |
| Example 8 | G-16 | 20 | 59 | 37 | 80 |
| Example 9 | G-17 | 40 | 12 | 39 | 89 |
| Example 10 | G-18 | 40 | 12 | 38 | 87 |
| Comparative Example 9 | G-19 | 20 | 57 | 20 | 82 |

(Part 2)

|  | physical properties | | | | |
|---|---|---|---|---|---|
|  | tensile strength (kg/cm²) | $M_{300}$ (kg/cm²) | elongation (%) | Lambourn abrasion index[1] | tan δ at 50° C. |
| Example 5 | 240 | 80 | 620 | 90 | 0.100 |
| Example 6 | 253 | 74 | 590 | 98 | 0.106 |
| Example 7 | 255 | 70 | 580 | 97 | 0.105 |
| Comparative Example 7 | 130 | 37 | 680 | 50 | 0.170 |
| Comparative Example 8 | 210 | 66 | 640 | 68 | 0.115 |
| Example 8 | 261 | 98 | 550 | 110 | 0.093 |
| Example 9 | 273 | 91 | 540 | 114 | 0.095 |
| Example 10 | 275 | 90 | 540 | 116 | 0.094 |
| Comparative Example 9 | 152 | 40 | 680 | 65 | 0.130 |

[1] The abrasion resistance of the elastomer composition was compared with that of the reference composition which contained the same components except that 50 parts by weight of HAF carbon was used as the filler in the reference composition, and was expressed as an index based on the value of the reference composition set to 100.

[Molecular structure of the functionalized polymer]

The molecular structures of the functionalized polymers used in the examples were examined as follows.

(Molecular Structure-1)

Because it is difficult to detect the amine in the functionalized polymer represented by formula (1), a low molecular weight polymer was prepared. A low molecular weight functionalized polymer having an average molecular weight of 2000 was obtained by the same method as that used in Example 3 except that 50 mmol of n-butyllithium, 50 mmol of HMI, and 2.5 mmol of potassium t-amylate were used. The content of nitrogen in this polymer was determined and found to be 0.6%. When a polymer has one amine in a molecule, the theoretical nitrogen content is 0.7%. Thus, the presence of the amine group in the copolymer was confirmed.

Low molecular weight polymers g-1, g-2, and g-3 were obtained by the same method as that used in Example 2 except that the amount of BuLi was increased to the amounts illustrated in the following Table 4, and the amounts of the alkoxysilane compound, the imine compound, and the randomizer were increased in such a manner that the mol ratios of these compounds to BuLi were kept the same as those in Example 2.

TABLE 4

| | $M_n$ of the base polymer (×10³) | $M_w/M_n$ | coupling efficiency (%) | amount of BuLi (mmol) |
|---|---|---|---|---|
| g-1 | 5.11 | 1.06 | 73 | 18 |
| g-2 | 8.11 | 1.06 | 62 | 12 |
| g-3 | 19.9 | 1.05 | 53 | 6 |

Figure 1B:
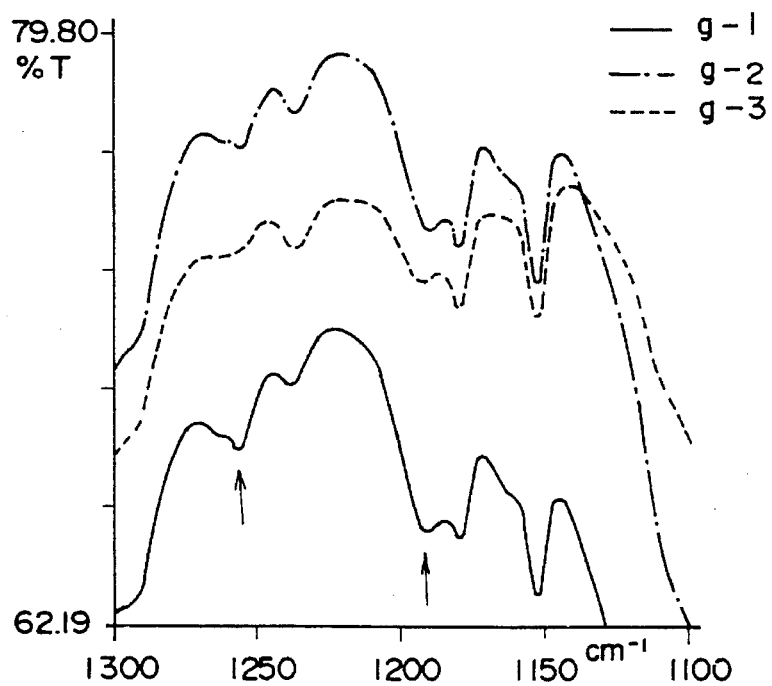
Figure 2:
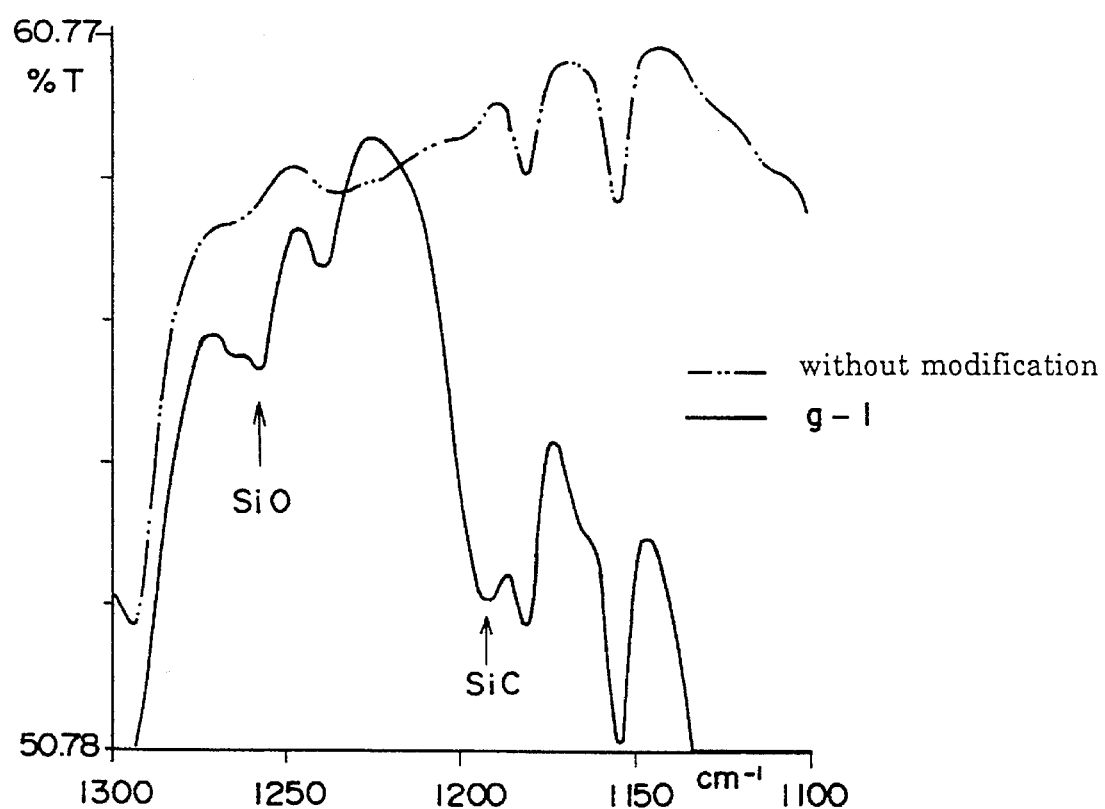
FIG. 2 illustrates infrared spectra which show the presence of the Si—O bond and the Si—C bond in the polymer of the present invention.

By using the resultant low molecular weight functionalized polymers, infrared spectra were measured with a spectrometer FT-IR 1650, a product of Perkin Elmer Company, in accordance with the thin film method, and Si—O and Si—C bonds were observed. It is known that the presence of an Si—O bond and an Si—C bond can be confirmed by absorptions at about 1260 cm⁻¹ and about 1160 cm⁻¹, respectively (Japanese Patent Application Laid-Open No. Showa 62(1987)-227908). FIG. 1 shows infrared spectra of the functionalized polymers of the present invention described above. In FIG. 1, (1A) shows the infrared spectrum of the polymer corresponding to the functionalized polymer used in (1B) but without modification with the alkoxysilane, and (1B) shows the infrared spectrum of the functionalized polymer of the present invention described above. In FIG. 2, the spectra of the functionalized polymers which are the functionalized polymer corresponding to the functionalized polymer g-1 but without modification and the functionalized polymer g-1 described above, are shown together.

As shown in FIGS. 1 and 2, absorptions assigned to the Si—O bond and the Si—C bond were observed at 1260 cm⁻¹ and 1190 cm⁻¹, respectively, in the spectra of the functionalized polymer of the present invention. The presence of an Si—O bond and an Si—C bond in the functionalized polymer could be further confirmed by the finding that both absorptions were increased with a decrease in the molecular weight, which means an increase in the concentrations of the Si—O bond and the Si—C bond in the functionalized polymer molecule.

Therefore, it has been confirmed from both the reaction of the preparation and the analysis of the molecular structure of the functionalized polymer represented by formula (1) that this functionalized polymer has a functional group containing nitrogen and an alkoxysilano group.

(Molecular Structure-2)

The functionalized polymer represented by formula (2) was analyzed by the same method as that used in Molecular Structure-1 described above except that Example 9 was referred to in place of Example 3. The following results were obtained.

(1) The presence of an amine, an Si—O bond, and an Si—C bond in the molecular structure of this functionalized polymer were confirmed.

Figure 3:
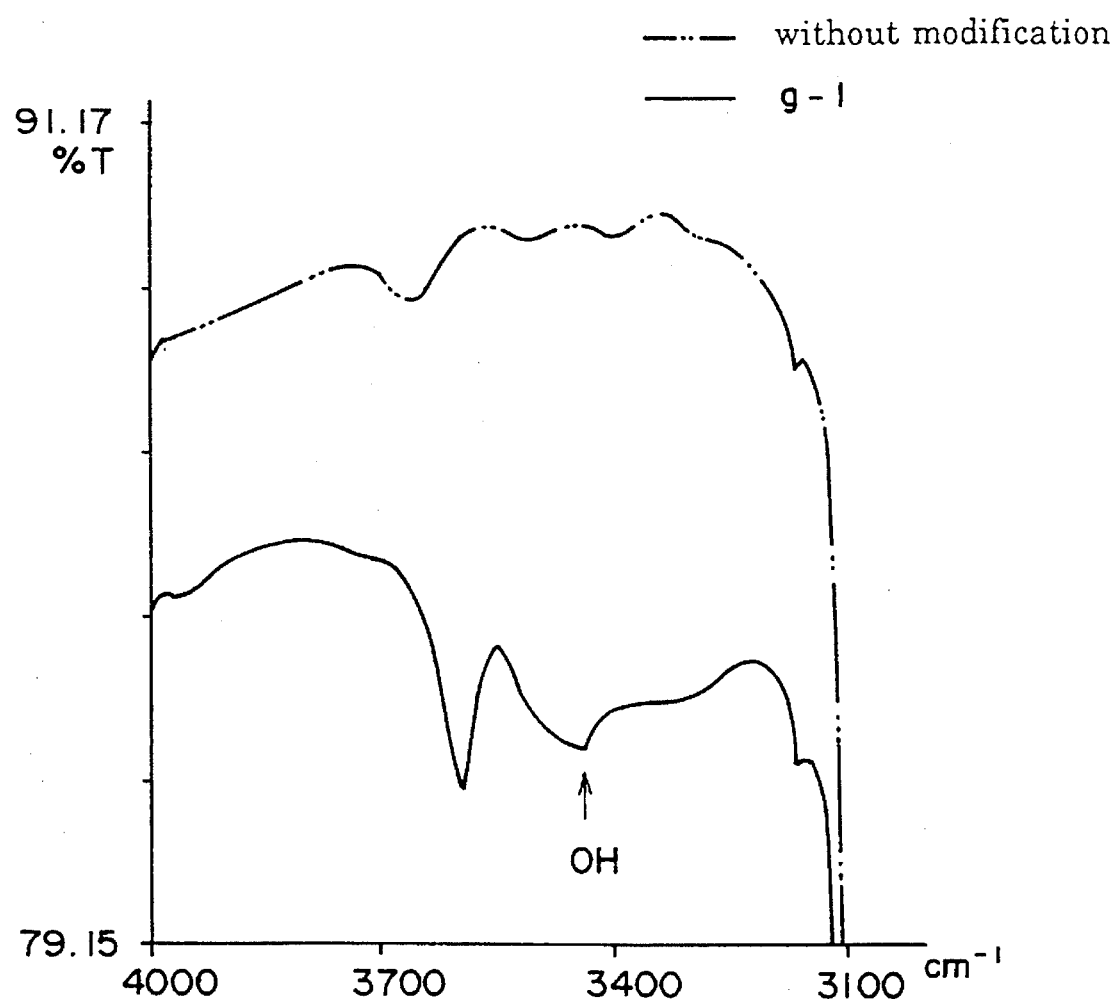
FIG. 3 illustrates infrared spectra which show the presence of the OH group in the polymer of the present invention.

(2) The absorptions assigned to the hydroxyl group were observed at 3100 to 4000 cm⁻¹ in the infrared spectrum of this polymer as shown in FIG. 3.

Therefore, it has been confirmed from both the reaction of the preparation and the analysis of the molecular structure of the functionalized polymer represented by formula (2) that this functionalized polymer has a functional group containing nitrogen, a hydroxyl group, and an alkoxysilano group.

As clearly shown in Table 3, it can be understood that the elastomeric composition comprising the functionalized polymer represented by formula (1) has excellent fracture properties, abrasion resistance, and low hysteresis loss (tan δ at 50° C.) without any adverse effects on wet grip (tan δ at 0° C.).

The effects of the elastomeric composition comprising the functionalized polymer represented by formula (1) described above can be more clearly seen by comparing the examples and the comparative examples. The differences are apparent from: the effect of the presence/absence of the functional group containing nitrogen in the functionalized polymer (present in Examples 1 to 4 as compared with absent in Comparative Examples 2 to 4); the effect of the presence/absence of the alkoxysilane group in the functionalized polymer (present in Examples 1 to 4 as compared with absent in Comparative Examples 5 to 6); the combined effect of the presence/absence of the functional group containing nitrogen and the alkoxysilane group in the functionalized polymer (present in Examples 1 to 4 as compared with absent in Comparative Example 1); the effect exhibited by the functional group containing nitrogen without any particular restriction of the type thereof when it is used within the range of the present invention (Examples 1 and 2 compared with the comparative examples); and the effect exhibited by the alkoxysilane group without any particular restriction of the type thereof when it is used within the range of the present invention (Examples 2, 3 and 4 compared with the comparative examples).

It can be clearly understood from Table 6 that the elastomeric composition comprising the functionalized polymer represented by the formulae (2) or (3) has excellent fracture properties, abrasion resistance, and low hysteresis loss (tan δ at 50° C.) without any increase in the Mooney viscosity of the composition (compound $ML_{1+4}$).

The effects of the elastomeric composition comprising the functionalized polymer represented by formula (2) or (3) described above can be more clearly seen by comparing the examples and the comparative examples. The differences are apparent from: the effect of the presence/absence of the functional group containing hydroxyl group in the functionalized polymer (present in Examples 5 to 7 as compared with absent in Comparative Example 8); the combined effect of the presence/absence of the functional group containing hydroxyl group and the alkoxysilane, aryloxysilane or aralkyloxysilane group in the functionalized polymer (present in Examples 5 to 7 as compared with absent in Comparative Example 7, and present in Examples 8 to 10 as compared with absent in Comparative Example 9); and the effect exhibited by the functional group containing hydroxyl group without any particular restriction of the type thereof when it is used within the range of the present invention (Examples 6, 7, 9, and 10 compared with the comparative examples).

What is claimed is:

1. A functionalized polymer comprising a conjugated diene polymer or a conjugated diene/vinyl aromatic hydrocarbon polymer having at least one of an alkoxysilane group, an aryloxysilane group or an aralkyloxysilane group wherein the functionalized polymer has a molecular structure selected from the group consisting of formula (1), formula (2), formula (3), and mixtures thereof:

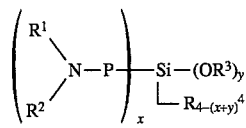

formula (1)

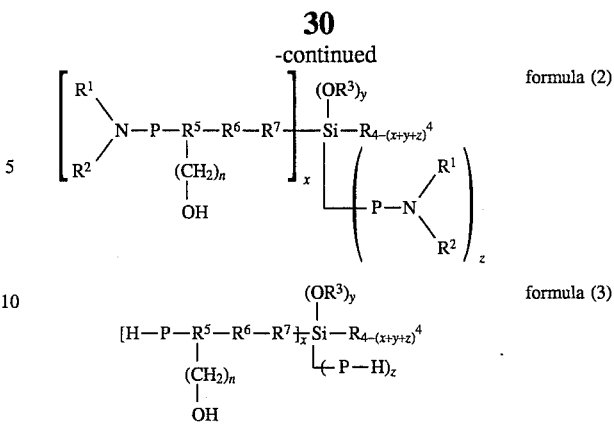

wherein P represents a conjugated diene polymer or a conjugated diene/vinyl aromatic hydrocarbon polymer; $R^1$ and $R^2$ may be the same or different, and are each selected from the group consisting of an aliphatic hydrocarbon group, an alicyclic hydrocarbon group and an aromatic hydrocarbon group, each having 20 or less carbon atoms, or $R^1$ and $R^2$ may be bonded together with the nitrogen atom to form a heterocyclic ring, wherein the heterocyclic ring may additionally contain an oxygen atom or a nitrogen atom; $R^3$ and $R^4$ may be the same or different, and are each selected from the group consisting of an aliphatic hydrocarbon group, an alicyclic hydrocarbon group, and an aromatic hydrocarbon group, each having 20 or less carbon atoms; $R^5$ is selected from the group consisting of an aliphatic hydrocarbon group and an alicyclic hydrocarbon group, each having 20 or less carbon atoms; $R^6$ is selected from the group consisting of an oxygen atom and a methylene group; $R^7$ represents an aliphatic hydrocarbon group having 1 to 20 carbon atoms; x represents an integer of 1 to 3; x+y and x+y+z each represent an integer of 2 to 4; n represents 0 or 1; and when y is 2 or 3, each $R^3$ may be the same or different.

2. A functionalized polymer according to claim 1, wherein the functionalized polymer having a molecular structure represented by formula (1) is obtained by steps of polymerizing a conjugated diene hydrocarbon monomer or a conjugated diene hydrocarbon monomer/vinyl aromatic hydrocarbon monomer with a lithium amide initiator prepared from a secondary amine compound or an imine compound and an organolithium compound, and adding at least one compound selected from the group consisting of an alkoxysilane compound, an aryloxysilane compound and an aralkyloxysilane compound to the conjugated diene polymer or the conjugated diene/vinyl aromatic hydrocarbon polymer having a lithium active end obtained in the said step of polymerizing.

3. A functionalized polymer according to claim 1, wherein the functionalized polymer having a molecular structure represented by formula (2) is obtained by steps of polymerizing a conjugated diene hydrocarbon monomer or a conjugated diene hydrocarbon monomer/vinyl aromatic hydrocarbon monomer with a lithium amide initiator prepared from a secondary amine compound or an imine compound and an organolithium compound, and adding at least one compound selected from the group consisting of an alkoxysilane compound, an aryloxysilane compound and an aralkyloxysilane compound having an epoxy group to the conjugated diene polymer or the conjugated diene/vinyl aromatic hydrocarbon polymer having a lithium active end obtained in the said step of polymerizing.

4. A functionalized polymer according to claim 1, wherein the conjugated diene polymer or the conjugated diene/vinyl aromatic hydrocarbon copolymer is polybutadiene.

5. A functionalized polymer according to claim 1, wherein the conjugated diene polymer or the conjugated diene/vinyl aromatic hydrocarbon copolymer is butadiene/styrene copolymer.

6. A functionalized polymer according to claim 1, wherein $R^1$ and $R^2$ in formula (1) and formula (2) are each selected from the group consisting of:

an aliphatic hydrocarbon group, an alicyclic hydrocarbon group, an aromatic hydrocarbon group, each of which has 13 or less carbon atoms, and $R^1$ and $R^2$ together with the nitrogen atom are bonded to each other to from the heterocyclic ring having 2 to 13 carbon atoms.

7. A functionalized polymer according to claim 1, wherein $R^1$ and $R^2$ in formula (1) and formula (2) together with the nitrogen atom are bonded to each other to form the heterocyclic structure having 4 to 12 carbon atoms.

8. A functionalized polymer according to claim 7, wherein the residue group of an imine compound is the residue group of hexamethyleneimine.

9. A functionalized polymer according to claim 1, wherein $R^3$ in formula (1), formula (2), and formula (3) is selected from the group consisting of an aliphatic hydrocarbon group and an aromatic hydrocarbon group, each having 10 or less carbon atoms.

10. A functionalized polymer according to claim 1, wherein $R^4$ in formula (1), formula (2), and formula (3) is selected from the group consisting of an aliphatic hydrocarbon group having 1 to 3 carbon atoms and phenyl group.

11. A functionalized polymer according to claim 1, wherein $R^5$ in formula (2) and formula (3) is selected from the group consisting of an aliphatic hydrocarbon group and an alicyclic hydrocarbon group, each having 6 or less carbon atoms.

12. A functionalized polymer according to claim 1, wherein $R^6$ in formula (2) and formula (3) represents an oxygen atom or an unsubstituted methylene group.

13. A functionalized polymer according to claim 1, wherein $R^7$ in formula (2) and formula (3) is selected from aliphatic hydrocarbon groups having 1 to 4 carbon atoms.

14. A functionalized polymer according to claim 2, wherein the lithium amide is lithium hexamethyleneimine and wherein the at least one compound selected from the group consisting of the alkoxysilane compound, the aryloxysilane compound and the aralkyloxysilane compound is methyltriphenoxysilane.

15. A functionalized polymer according to claim 3, wherein the lithium amide is lithium hexamethyleneimine and the alkoxysilane compound having an epoxy group is 3-glycidoxypropyltrimethoxysilane.

16. A functionalized polymer according to claim 2, wherein the lithium amide is lithium hexamethyleneimine and wherein the at least one compound selected from the group consisting of the alkoxysilane compound having an epoxy group, the aryloxysilane compound having an epoxy group and the aralkyloxysilane compound having an epoxy is methyltriphenoxysilane.

17. A functionalized polymer according to claim 1, wherein the methylene group representing $R^6$ in formula (2) and formula (3) is substituted with a methyl group, an ethyl group or a propyl group.

18. An elastomeric composition comprising:

a rubber material containing a functionalized copolymer in an amount of 10 or more parts by weight in 100 parts by weight of the rubber material, and a filler in an amount of 10 to 100 parts by weight based on 100 parts by weight of the rubber material, wherein the filler contains a white carbon, and the functionalized polymer comprises a conjugated diene polymer or a conjugated diene/vinyl aromatic hydrocarbon polymer having at least one of an alkoxysilane group, an aryloxysilane group or an aralkyloxysilane group, wherein the functionalized polymer has a molecular structure selected from the group consisting of formula (1), formula (2), formula (3), and mixtures thereof:

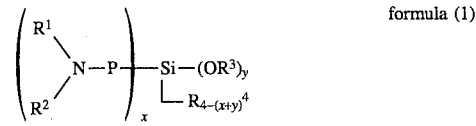
formula (1)

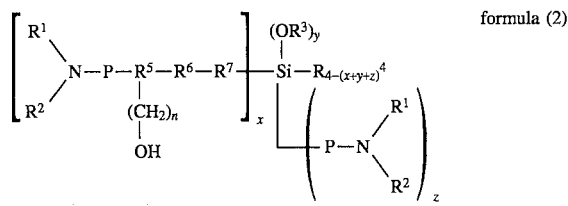
formula (2)

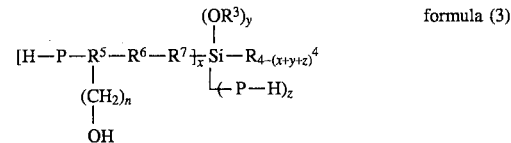
formula (3)

wherein P represents a conjugated diene polymer or a conjugated diene/vinyl aromatic hydrocarbon polymer; $R^1$ and $R^2$ may be the same or different, and are each selected from the group consisting of an aliphatic hydrocarbon group, an alicyclic hydrocarbon group and an aromatic hydrocarbon group, each having 20 or less carbon atoms, or $R^1$ and $R^2$ may be bonded together with the nitrogen atom to form a heterocyclic ring, wherein the heterocyclic ring may additionally contain an oxygen atom or a nitrogen atom; $R^3$ and $R^4$ may be the same or different, and are each selected from the group consisting of an aliphatic hydrocarbon group, an alicyclic hydrocarbon group, and an aromatic hydrocarbon group, each having 20 or less carbon atoms; $R^5$ is selected from the group consisting of an aliphatic hydrocarbon group and an alicyclic hydrocarbon group, each having 20 or less carbon atoms; $R^6$ is selected from the group consisting of an oxygen atom and a methylene group; $R^7$ represents an aliphatic hydrocarbon group having 1 to 20 carbon atoms; x represents an integer of 1 to 3; x+y and x+y+z each represent an integer of 2 to 4; n represents 0 or 1; and when y is 2 or 3, each $R^3$ may be the same or different.

19. An elastomeric composition according to claim 18, wherein the functionalized polymer having a molecular structure represented by formula (1) is obtained by steps of polymerizing a conjugated diene hydrocarbon monomer or a conjugated diene hydrocarbon monomer/vinyl aromatic hydrocarbon monomer with a lithium amide initiator prepared from a secondary amine compound or an imine compound and an organolithium compound, and adding at least one compound selected from the group consisting of an alkoxysilane compound, an aryloxysilane compound and an aralkyloxysilane compound to the conjugated diene polymer or the conjugated diene/vinyl aromatic hydrocarbon polymer having a lithium active end obtained in the said step of polymerizing.

20. An elastomeric composition according to claim 18, wherein the functionalized polymer having a molecular structure represented by formula (2) is obtained by steps of polymerizing a conjugated diene hydrocarbon monomer or a conjugated diene hydrocarbon monomer/vinyl aromatic hydrocarbon monomer with a lithium amide initiator prepared from a secondary amine compound or an imine compound and an organolithium compound, and adding at least one compound selected from the group consisting of an alkoxysilane compound having an epoxy group, an aryloxysilane compound having an epoxy group and an aralkyloxysilane compound having an epoxy group to the conjugated diene polymer or the conjugated diene/vinyl aromatic hydrocarbon polymer having a lithium active end obtained in the said step of polymerizing.

21. A functionalized polymer according to claim 18, wherein the conjugated diene polymer or the conjugated diene/vinyl aromatic hydrocarbon copolymer is polybutadiene.

22. A functionalized polymer according to claim 18, wherein the conjugated diene polymer or the conjugated diene/vinyl aromatic hydrocarbon copolymer is butadiene/styrene copolymer.

23. A functionalized polymer according to claim 18, wherein $R^1$ and $R^2$ in formula (1) and formula (2) are each selected from the group consisting of:

an aliphatic hydrocarbon group, an alicyclic hydrocarbon group, an aromatic hydrocarbon group, each of which has 13 or less carbon atoms, and $R^1$ and $R^2$ together with the nitrogen atom are bonded to each other to from the heterocyclic ring having 2 to 13 carbon atoms.

24. A functionalized polymer according to claim 18, wherein $R^1$ and $R^2$ in formula (1) and formula (2) together with the nitrogen atom are bonded to each other to form the heterocyclic structure having 4 to 12 carbon atoms.

25. An elastomeric composition according to claim 24, wherein the residue group of an imine compound is the residue group of hexamethyleneimine.

26. An elastomeric composition according to claim 18, wherein $R^3$ in formula (1), formula (2), and formula (3) is selected from the group consisting of an aliphatic hydrocarbon group and an aromatic hydrocarbon group, each having 10 or less carbon atoms.

27. An elastomeric composition according to claim 18, wherein $R^4$ in formula (1), formula (2), and formula (3) is selected from the group consisting of an aliphatic hydrocarbon group having 1 to 3 carbon atoms and phenyl group.

28. An elastomeric composition according to claim 18, wherein $R^5$ in formula (2) and formula (3) is selected from the group consisting of an aliphatic hydrocarbon group and an alicyclic hydrocarbon group, each having 6 or less carbon atoms.

29. An elastomeric composition according to claim 18, wherein $R^6$ in formula (2) and formula (3) represents an oxygen atom or an unsubstituted methylene group.

30. An elastomeric composition according to claim 18, wherein $R^7$ in formula (2) and formula (3) is selected from aliphatic hydrocarbon groups having 1 to 4 carbon atoms.

31. An elastomeric composition according to claim 18, wherein the filler is a white carbon and is present in the composition in an amount of 20 to 60 parts by weight based on 100 parts by weight of the rubber material.

32. An elastomeric composition according to claim 20, wherein the lithium amide is lithium hexamethyleneimine and the alkoxysilane compound having an epoxy group is 3-glycidoxypropyltrimethoxysilane.

33. An elastomeric composition according to claim 18, wherein the methylene group representing $R^6$ in formula (2) and formula (3) is substituted with a methyl group, an ethyl group or a propyl group.

* * * * *